United States Patent
Shimono

(10) Patent No.: US 10,437,806 B2
(45) Date of Patent: Oct. 8, 2019

(54) DATABASE MANAGEMENT METHOD AND INFORMATION PROCESSING APPARATUS

(71) Applicant: FUJITSU LIMITED, Kawasaki-shi, Kanagawa (JP)

(72) Inventor: Akio Shimono, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 1091 days.

(21) Appl. No.: 14/482,407

(22) Filed: Sep. 10, 2014

(65) Prior Publication Data

US 2014/0379727 A1 Dec. 25, 2014

Related U.S. Application Data

(63) Continuation of application No. PCT/JP2012/057953, filed on Mar. 27, 2012.

(51) Int. Cl.
G06F 16/20 (2019.01)
G06F 16/22 (2019.01)
G06F 16/23 (2019.01)
G06F 16/21 (2019.01)

(52) U.S. Cl.
CPC .......... *G06F 16/2272* (2019.01); *G06F 16/21* (2019.01); *G06F 16/23* (2019.01)

(58) Field of Classification Search
CPC .......... G06F 17/30345; G06F 16/2272; G06F 16/21; G06F 16/23
USPC ........................................................ 707/741
See application file for complete search history.

(56) References Cited

U.S. PATENT DOCUMENTS

| 5,805,824 A * | 9/1998 | Kappe | G06F 17/24 |
| | | | 707/E17.005 |
| 7,779,045 B2 * | 8/2010 | Mohamed | G06F 17/30339 |
| | | | 707/802 |
| 2008/0263341 A1 * | 10/2008 | Ozer | G06F 9/383 |
| | | | 712/239 |
| 2011/0010369 A1 | 1/2011 | Kan | |

FOREIGN PATENT DOCUMENTS

| JP | 6-215037 | 8/1994 |
| JP | 2010-237866 | 10/2010 |
| JP | 2011-065546 | 3/2011 |
| WO | 2009/119811 | 10/2009 |
| WO | 2011/033734 | 3/2011 |

OTHER PUBLICATIONS

Zhang, Xiangyu, et al. "An efficient multi-dimensional index for cloud data management." Proceedings of the first international workshop on Cloud data management. ACM, 2009.*

(Continued)

*Primary Examiner* — Kristopher Andersen
(74) *Attorney, Agent, or Firm* — Fujitsu Patent Center

(57) ABSTRACT

An information processing apparatus includes a determination unit and an output unit. If data included in a database with an index is updated, the determination unit determines whether to perform an index update process so that the index update process will be performed with a determined probability. If the determination unit determines to perform the index update process, the output unit outputs an index update request.

5 Claims, 17 Drawing Sheets

(56) References Cited

OTHER PUBLICATIONS

International Search Report, mailed in connection with PCT/JP2012/057953 and dated May 1, 2012.
Japanese Office Action dated Dec. 8, 2015 for corresponding Japanese Patent Application No. 2014-507098, with Partial English Translation, 6 pages. Please note WO-2009/119811-A cited herein, was previously cited in an IDS filed on Sep. 10, 2014.*.

* cited by examiner

DATABASE MANAGEMENT METHOD AND INFORMATION PROCESSING APPARATUS

CROSS-REFERENCE TO RELATED APPLICATION

This application is a continuation application of International Application PCT/JP2012/057953 filed on Mar. 27, 2012 which designated the U.S., the entire contents of which are incorporated herein by reference.

FIELD

The embodiments discussed herein are related to a method for managing a database having an index and an information processing apparatus.

BACKGROUND

Much of data handled in computer systems is managed by databases. As the amount of data stored in a database increases, time required for data retrieval becomes longer. For example, if data is all scanned and data which meets a retrieval condition is extracted, the calculation time required is O(N) in O notation (N is the number of pieces of data and is an integer greater than or equal to 1). Accordingly, in order to make database retrieval efficient, index data (index), for example, for data stored in a database is generated. By building an index, calculation time is reduced to about O(logN).

For example, a value (index value) which is a key for a piece of data in a database and location information for the piece of data are associated with each other and are registered in an index. In order to retrieve from a database having an index, an index value corresponding to a retrieval key is retrieved from the index. Data is acquired on the basis of location information for the data associated with the key, and is outputted as a retrieval result.

When data in such a database having an index is updated, the index is updated. This makes it possible to quickly find data after update at retrieval time. Accordingly, an automatic index update apparatus which automatically builds and deletes an index is proposed. Each time an attribute of data to be retrieved is accessed, the apparatus updates access frequency information for the attribute. The apparatus evaluates on the basis of the access frequency information whether to update the contents of an index, and updates the contents of the index on the basis of an evaluation result.

Japanese Laid-open Patent Publication No. 06-215037

An index is structured by the use of, for example, a tree structure so that high-speed retrieval can be performed. Therefore, in an index update process not only is an index value added, changed, or deleted, but the data structure of an index is rebuilt. If the data structure of an index is rebuilt each time data in a database is updated, a processing load on an entire system is excessive. Accordingly, for example, the following method may be adopted. An index is not updated at record update time and an index update process is performed at the time of the next retrieval. This prevents index update from occurring frequently, and increases the efficiency of processing by the entire system.

However, if an index is updated at retrieval time, time required for a response to a retrieval request depends on the number of records for which the index is not yet updated, and there are variations in response time at retrieval time. For example, time required for a response to a retrieval request inputted after update of a large amount of data is far longer than time required for a response to another retrieval request.

SUMMARY

According to an aspect, there is provided a database management method that includes determining, by a processor, at the time of data included in a database with an index being updated, whether to perform an index update process so that the index update process will be performed with a determined probability, and outputting, by the processor, an index update request at the time of determining to perform the index update process.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
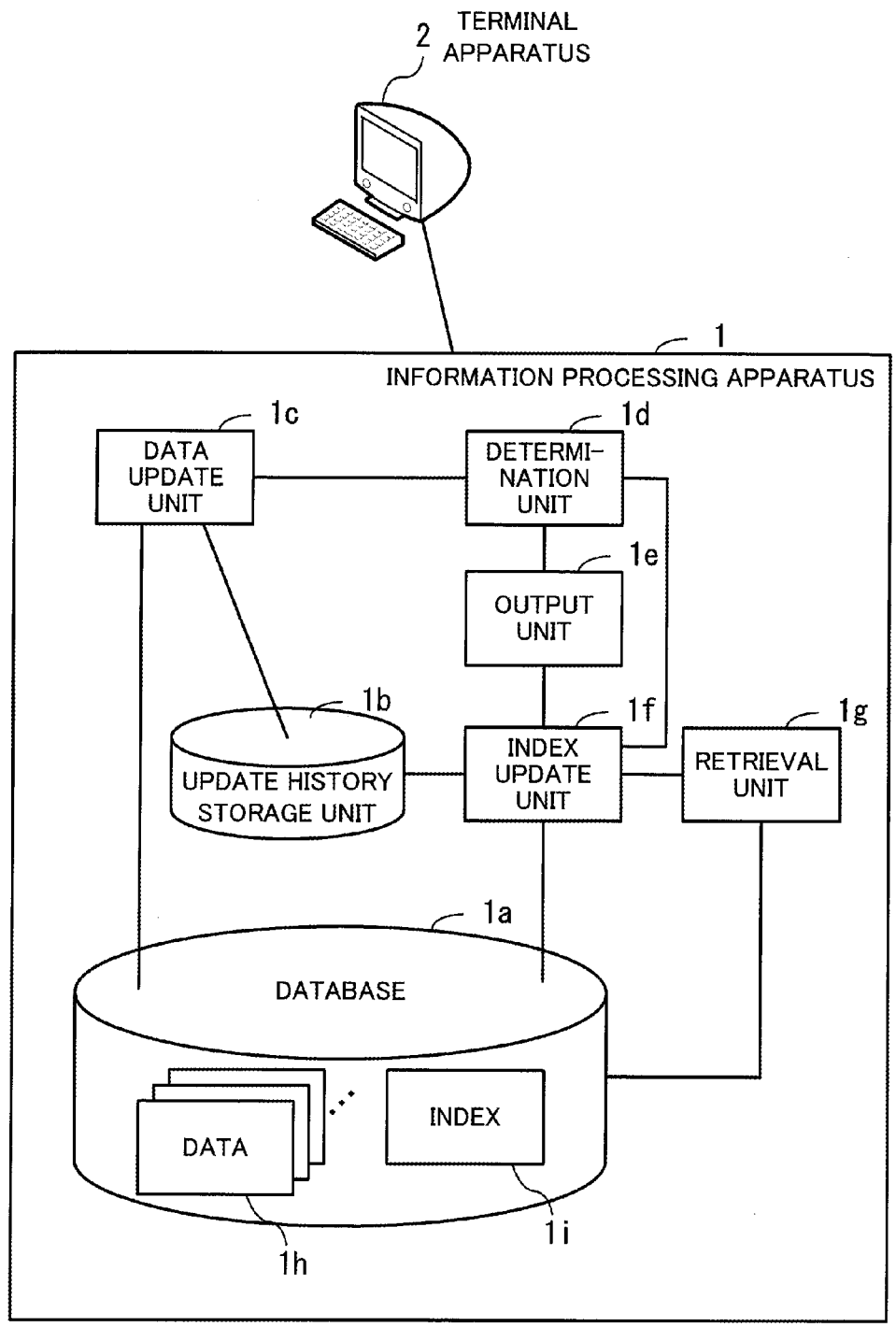
FIG. 1 illustrates an example of the functional structure of an apparatus according to a first embodiment.

Embodiments will now be described with reference to the accompanying drawings, wherein like reference numerals refer to like elements throughout. Plural embodiments may be combined if there is no contradiction between them.

(First Embodiment)

A first embodiment will be described first. In the first embodiment, when data included in a database having an index is updated, an index update process is performed with a determined probability.

For example, an index update method may be a first method, which is referred to as eager update in a way, or a second method, which is referred to as lazy update in a way.

With the first method, an index is updated when data is updated (added, updated, or deleted). With this method response time in a retrieval process is stable, but it takes time to update data. Furthermore, if a large amount of data is registered in a database in a short period of time, the performance of an entire system deteriorates.

With the second method, an index is not updated when data is updated. If a data retrieval request is inputted, an index is updated before data retrieval. With this method data is updated efficiently, but performance at data retrieval time varies. In particular, it takes a long time to perform data retrieval directly after update of a large amount of data.

In the first embodiment, when a data retrieval request is inputted, an index is updated. In addition, the index is updated at data update time with a determined probability (with a probability of one several tenth to one several hundredth, for example). This makes it possible to efficiently perform data update and control variations in performance at data retrieval time.

That is to say, in the first embodiment an index is not always updated at data update time. Accordingly, processing efficiency improves compared with the first method in which each time data update is performed, an index is updated. Furthermore, in the first embodiment the index is also updated at data update time with a determined probability. As a result, even if a large amount of data is updated in a short period of time, variations in performance at data retrieval time is controlled compared with the second method. With the second method, for example, there is a need to update an index value a million times before data retrieval after updating data a million times. This produces a powerful effect such as suspension of services. In the first embodiment, on the other hand, an index update process is performed at data update time one time out of several ten to several hundred. As a result, an index value is updated only about several tens to several hundreds of times before data retrieval. This curbs a bad effect such as suspension of services.

FIG. 1 illustrates an example of the functional structure of an apparatus according to the first embodiment. A terminal apparatus 2 is connected to an information processing apparatus 1 having a database 1a. In accordance with instructions from the terminal apparatus 2, the information processing apparatus 1 updates or retrieves data in the database 1a.

The information processing apparatus 1 includes the database 1a, an update history storage unit 1b, a data update unit 1c, a determination unit 1d, an output unit 1e, an index update unit 1f, and a retrieval unit 1g.

The database 1a includes plural pieces of data 1h and an index 1i. Key information (index value) extracted from a piece of data 1h is associated with identification information (such as a pointer to the piece of data 1h) for the piece of data 1h from which the key information is extracted, and is registered in the index 1i.

The update history storage unit 1b stores an update history of data update performed after the last index 1i update process. For example, a combination of identification information for data after update and the contents of the update (addition or deletion) is set in the update history.

The data update unit 1c updates data stored in the database 1a. For example, the data update unit 1c adds new data to, deletes data from, or changes data in the database 1a. For example, if the data update unit 1c updates data, the data update unit 1c stores a combination of identification information for data after the update and the contents of the update in the update history storage unit 1b as an update history.

If data in the database 1a including the index 1i is updated, the determination unit 1d determines whether to perform an index 1i update process so that the index 1i update process will be performed with a determined probability. For example, the determination unit 1d counts the number of times data in the database 1a is updated after the last index 1i update process. When the number of times counted reaches a determined value (threshold) corresponding to the determined probability, the determination unit 1d determines to perform an index 1i update process. Alternatively, the following method may be used. The determination unit 1d generates a random number. If the value of the random number is in a determined range corresponding to the determined probability, the determination unit 1d determines to perform an index 1i update process.

If the determination unit 1d determines to perform an index 1i update process, the output unit 1e outputs an index update request to the index update unit 1f.

The index update unit 1f updates the index 1i in response to an index update request. For example, the index update unit 1f acquires from the update history storage unit 1b an update history indicative of the process of updating data in the database 1a which is performed after the last index 1i update process. The index update unit 1f then updates the index 1i on the basis of the acquired update history. For example, the index update unit 1f adds an index value of added data to the index 1i on the basis of an update history indicative of data addition. Furthermore, the index update unit 1f deletes an index value of deleted data from the index 1i on the basis of an update history indicative of data deletion. After that, for example, the index update unit 1f sorts index values in the index 1i or rebuilds a data structure.

In accordance with instructions from the terminal apparatus 2 to retrieve data, the retrieval unit 1g retrieves the data from the database 1a. The retrieval unit 1g outputs an index update request to the index update unit 1f before the data retrieval. After the index update unit 1f updates the index 1i so as to put it into the latest state, the retrieval unit 1g retrieves the data from the database 1a. For example, the retrieval unit 1g retrieves from the index 1i an index value which matches a retrieval key indicated by the data retrieval request. On the basis of identification information associated with the index value, the retrieval unit 1g then extracts data indicated by the identification information from the database 1a. The retrieval unit 1g then transmits the extracted data to the terminal apparatus 2 as a retrieval result.

The data update unit 1c, the determination unit 1d, the output unit 1e, the index update unit 1f, and the retrieval unit 1g are realized by a CPU (Central Processing Unit) included in the information processing apparatus 1. In addition, the database 1a and the update history storage unit 1b are realized by a RAM (Random Access Memory), a HDD (Hard Disk Drive), and the like included in the information processing apparatus 1.

Furthermore, lines which connect the components illustrated in FIG. 1 indicate a part of a communication path and a communication path other than that illustrated in FIG. 1 may be set.

A data update process and a data retrieval process performed by the information processing apparatus 1 will now be described with reference to FIGS. 2 and 3. In the following examples it is assumed that whether to perform an index update process is determined by the use of a counter which indicates the number of times data update is performed after index update.

Figure 2:
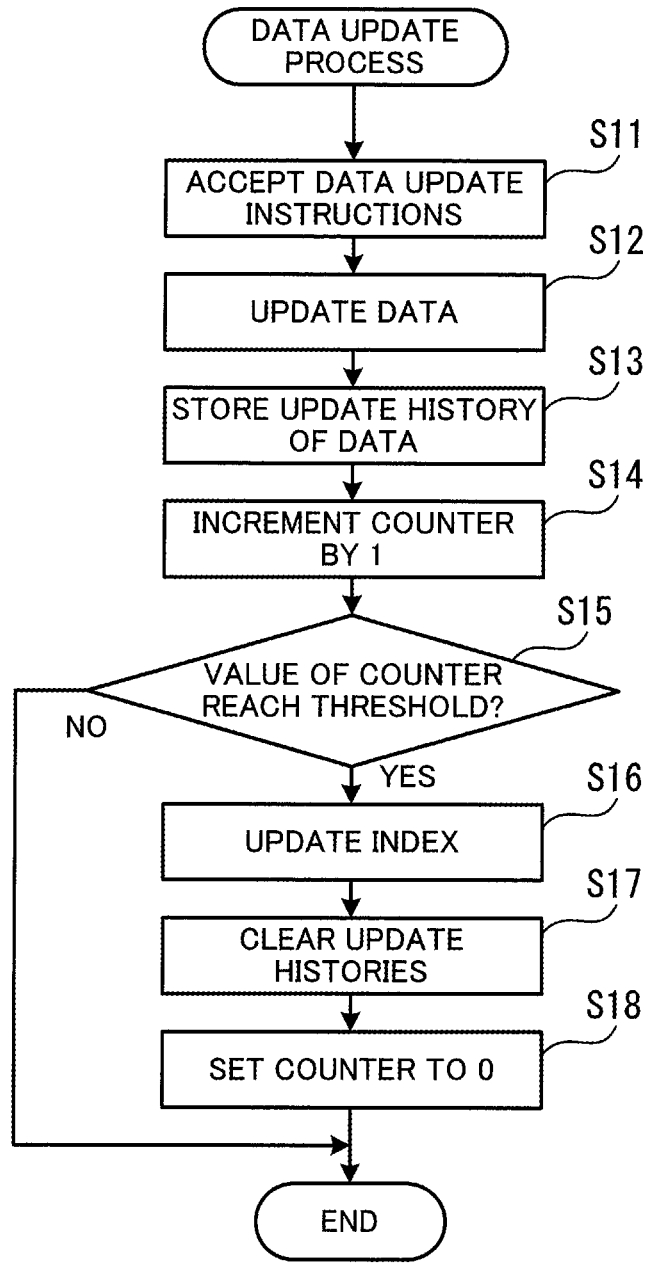
FIG. 2 is a flow chart of an example of a procedure for a data update process in the first embodiment.

FIG. 2 is a flow chart of an example of a procedure for a data update process in the first embodiment. A process indicated in FIG. 2 will now be described in order of step number.

(Step S11) The data update unit 1c accepts data update instructions from the terminal apparatus 2.

(Step S12) In accordance with the data update instructions the data update unit 1c updates data in the database 1a.

(Step S13) The data update unit 1c stores an update history of the data in the update history storage unit 1b. After that, the data update unit 1c informs the determination unit 1d that it performed data update.

(Step S14) The determination unit 1d increments by 1 the counter which indicates the number of times data update is performed. An initial value of the counter is 0.

(Step S15) The determination unit 1d determines whether or not a value of the counter reaches a threshold. The threshold is defined in advance according to a probability with which an index 1i update process is performed. For example, if index update is performed at data update time with a probability of 1/100, then the threshold is set to 100. If a value of the counter reaches the threshold, then the determination unit 1d determines to perform an index update process, and step S16 is performed. If a value of the counter does not reach the threshold, then the determination unit 1d terminates the process.

(Step S16) The output unit 1e outputs an index update request to the index update unit 1f. The index update unit 1f updates the index 1i on the basis of update histories accumulated in the update history storage unit 1b.

(Step S17) The index update unit 1f clears the update histories in the update history storage unit 1b.

(Step S18) The index update unit 1f informs the determination unit 1d that it updated the index 1i. The determination unit 1d sets the counter to 0. After that, the process ends.

Figure 3:
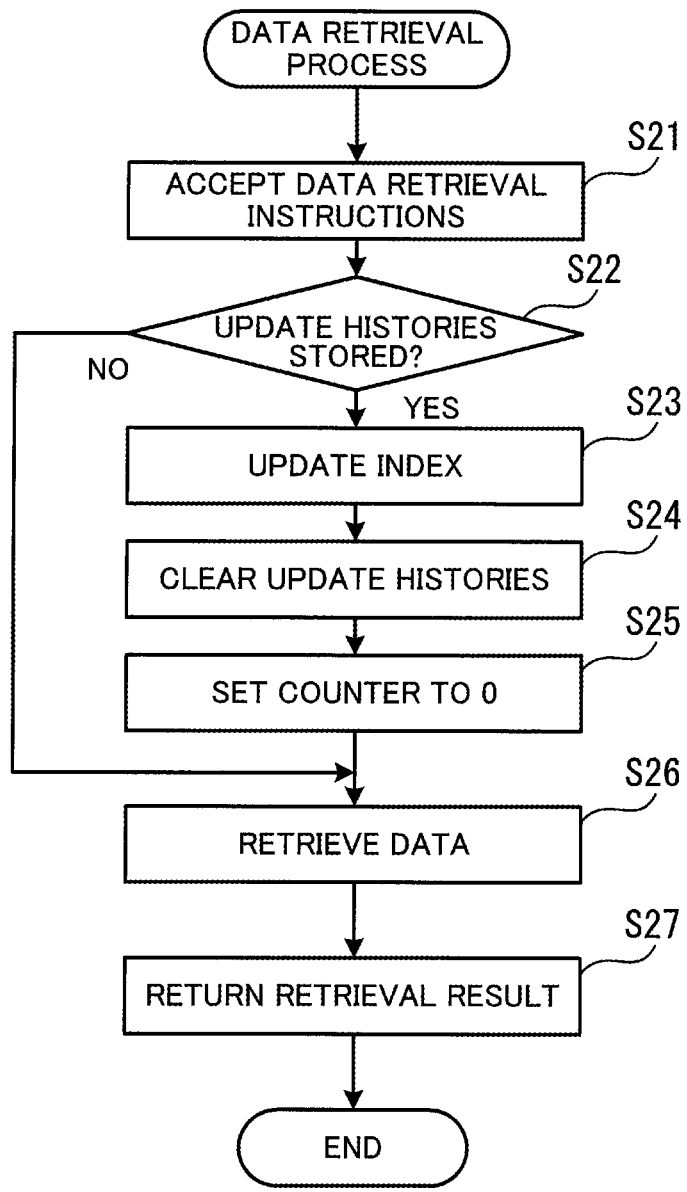
FIG. 3 is a flow chart of an example of a procedure for a data retrieval process in the first embodiment.

FIG. 3 is a flow chart of an example of a procedure for a data retrieval process in the first embodiment. A process indicated in FIG. 3 will now be described in order of step number.

(Step S21) The retrieval unit 1g accepts data retrieval instructions from the terminal apparatus 2.

(Step S22) The retrieval unit 1g determines whether or not there are update histories of data in the update history storage unit 1b. If there are update histories of data in the update history storage unit 1b, then the retrieval unit 1g proceeds to step S23. If there are no update histories of data in the update history storage unit 1b, then the retrieval unit 1g proceeds to step S26.

(Step S23) The retrieval unit 1g outputs an index update request to the index update unit 1f. The index update unit 1f updates the index 1i on the basis of the update histories accumulated in the update history storage unit 1b.

(Step S24) The index update unit 1f clears the update histories in the update history storage unit 1b.

(Step S25) The index update unit 1f informs the determination unit 1d and the retrieval unit 1g that it updated the index 1i. The determination unit 1d sets the counter to 0.

(Step S26) After the retrieval unit 1g checks that the index 1i is updated, the retrieval unit 1g retrieves the data from the database 1a in accordance with the data retrieval instructions.

(Step S27) The retrieval unit 1g returns a retrieval result to the terminal apparatus 2.

As has been described, an index is updated at data update time with a determined probability and is updated at data retrieval time.

Figure 4:
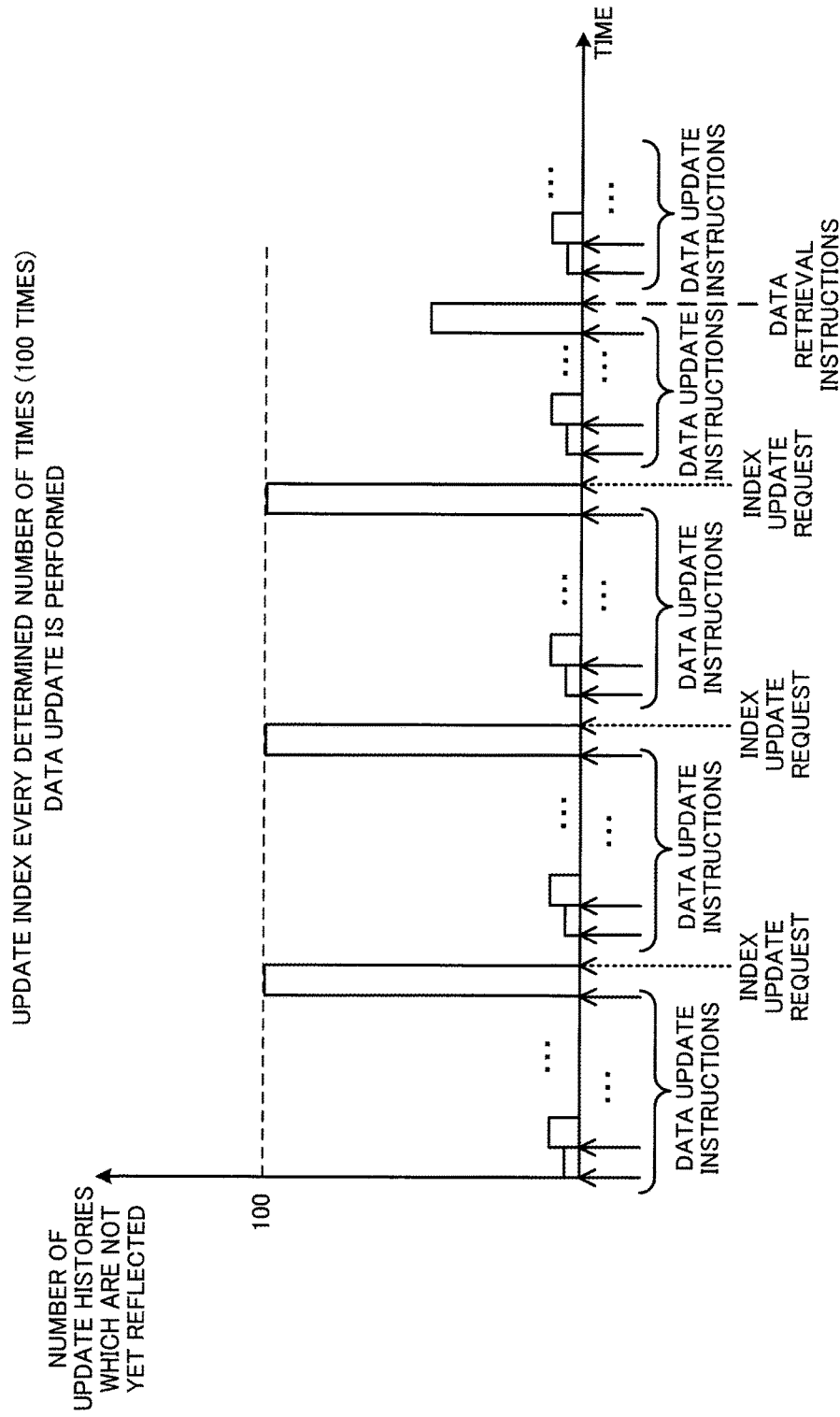
FIG. 4 indicates an example of a change in the number of update histories which are not yet reflected in an index in the first embodiment.

FIG. 4 indicates an example of a change in the number of update histories which are not yet reflected in an index in the first embodiment. In FIG. 4, a horizontal axis indicates time and a vertical axis indicates the number of update histories which are not yet reflected in the index 1i. In the example of FIG. 4, it is assumed that an index update process is performed at data update time with a probability of 0.01 (1%). In this case, a threshold is set to "100" in the determination unit 1d.

The number of update histories which are not yet reflected in the index 1i becomes 0 when the determination unit 1d determines to perform an index 1i update process and when the retrieval unit 1g receives data retrieval instructions. The number of update histories which are not yet reflected in the index 1i increases by 1 in the other period each time the data update unit 1c receives data update instructions.

In the example of FIG. 4, when a value of the counter becomes 100, an index update request is outputted and the index 1i is updated. As a result, the number of update histories which are not yet reflected in the index 1i is 100 at the most. This means that even if data update is performed, for example, tens of thousands of times after the last data retrieval instructions before this data retrieval instructions, the number of update histories which are reflected in the index 1i at data retrieval time is 100 at the most.

As has been described, an index update process is performed stochastically at data update time. This prevents a large number of index values which are not yet updated from remaining at the time when a retrieval request is accepted. Update of a large number of index values will bring about a situation in which a response to a retrieval request takes a long time, but such a situation is averted. That is to say, variations in time taken to make a response to a retrieval request are controlled.

In the example of FIG. 1, the database 1a is included in the information processing apparatus 1. However, the database 1a may be included in a second apparatus connected to the information processing apparatus 1 via a network. In that case, all or a part of the functions of the update history storage unit 1b, the data update unit 1c, the index update unit 1f, or the retrieval unit 1g may be included in the second apparatus including the database 1a.

(Second Embodiment)

A second embodiment will now be described. In a system according to a second embodiment in which a plurality of Web servers uses a database included in a database server, an index in the database is suitably updated in accordance with instructions from the plurality of Web servers.

In order to count, as in the first embodiment, by a counter the number of times data is updated in a system in which a plurality of Web servers give instructions to update an index, each Web server has need to be informed by another Web server about the number of times it updates data in a database. Accordingly, there is a need of a function used by the plurality of Web servers for sharing information in real time. As a result, processing becomes more complex and a processing load increases. Therefore, in the second embodiment each Web server uses a random number for stochastically determining whether to perform an index update process. By doing so, each Web server can make an index update request to a database server with proper frequency without being informed by another Web server about the number of times it updates data. As a result, efficiency in parallel processing by the plurality of Web servers improves and processing efficiency in a large-scale system improves.

Figure 5:
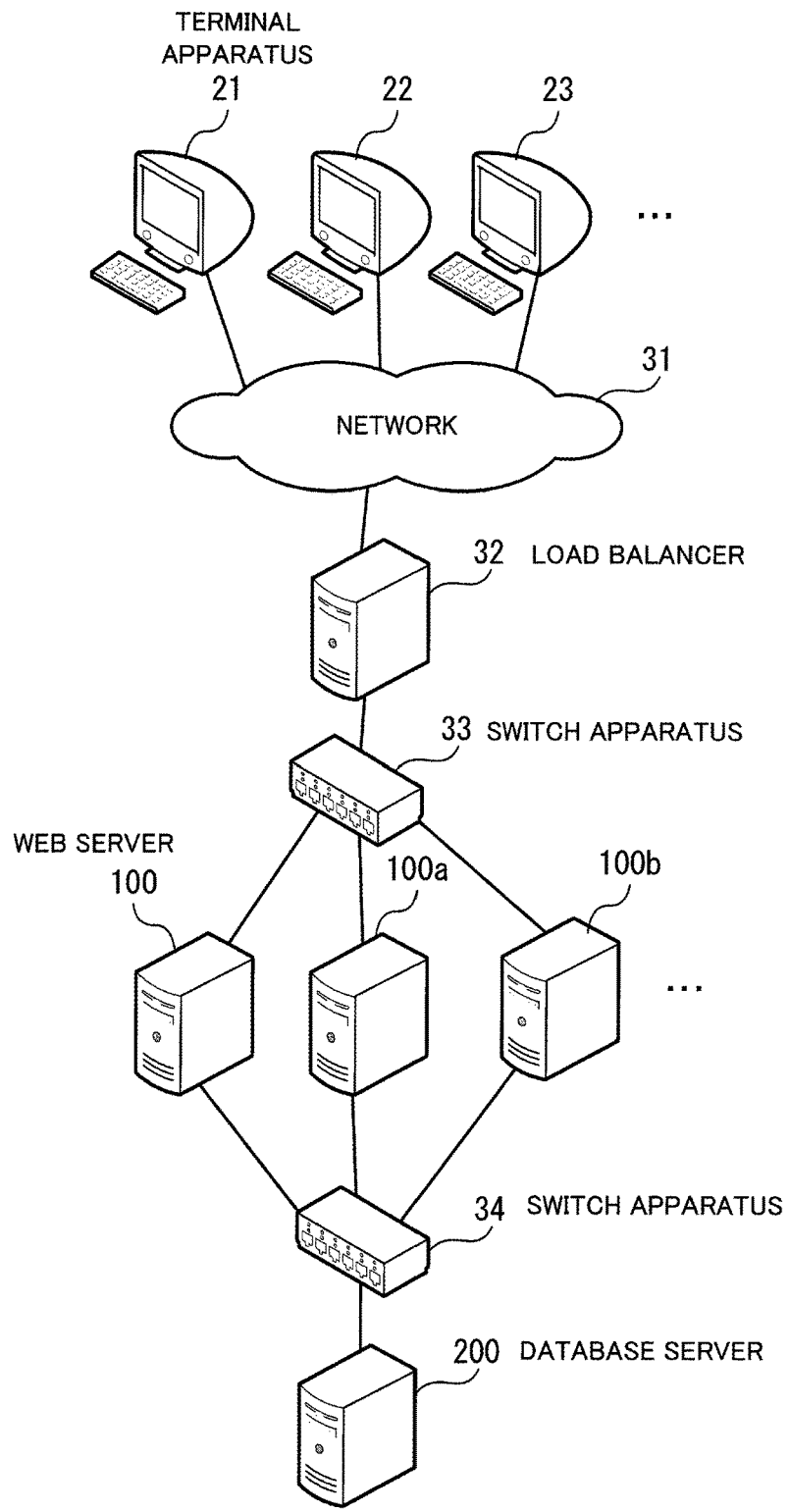
FIG. 5 illustrates an example of the structure of a system according to a second embodiment.

FIG. 5 illustrates an example of the structure of the system according to the second embodiment. A plurality of Web servers 100, 100a, 100b, etc. are connected to a database server 200 via a switch apparatus 34. The database server 200 includes a database whose records are managed by an index.

In addition, the Web servers 100, 100a, 100b, etc. are connected to a load balancer 32 via a switch apparatus 33. A plurality of terminal apparatus 21, 22, 23, etc. are connected to the load balancer 32 via a network 31. The terminal apparatus 21, 22, 23, etc. are computers used by users for using a database included in the database server 200. The load balancer 32 assigns requests from the terminal apparatus 21, 22, 23, etc. to the Web servers 100, 100a, 100b, etc. At this time the load balancer 32 determines the Web servers 100, 100a, 100b, etc. to which the requests are assigned so as to, for example, make a load on each Web server equal.

The Web servers 100, 100a, 100b, etc. perform processes in accordance with the requests from the terminal apparatus 21, 22, 23, etc. For example, if the Web servers 100, 100a, 100b, etc. receive requests to manipulate data managed by the database server 200, then the Web servers 100, 100a, 100b, etc. give the database server 200 instructions to, for example, update or retrieve a record in the database.

In the second embodiment, if the Web servers 100, 100a, 100b, etc. update records in the database included in the database server 200, then the Web servers 100, 100a, 100b, etc. determine whether to update the index. The Web servers 100, 100a, 100b, etc. determine in accordance with a stochastic judgment based on a random number whether to perform an index update process. For example, in order to determine whether to perform an index update process, each of the Web servers 100, 100a, 100b, etc. prepares a "lot drawing" mechanism using random numbers. In the "lot drawing" mechanism, a winning number is drawn with a specific probability (1% or 5%, for example) and a blank is drawn in the other cases. Each of the Web servers 100, 100a, 100b, etc. performs "lot drawing" at update time. When each of the Web servers 100, 100a, 100b, etc. draws a winning number, it transmits an index update request to the database server 200. On the other hand, when the database server 200 receives an index update request or a data retrieval request, the database server 200 updates the index.

Figure 6:
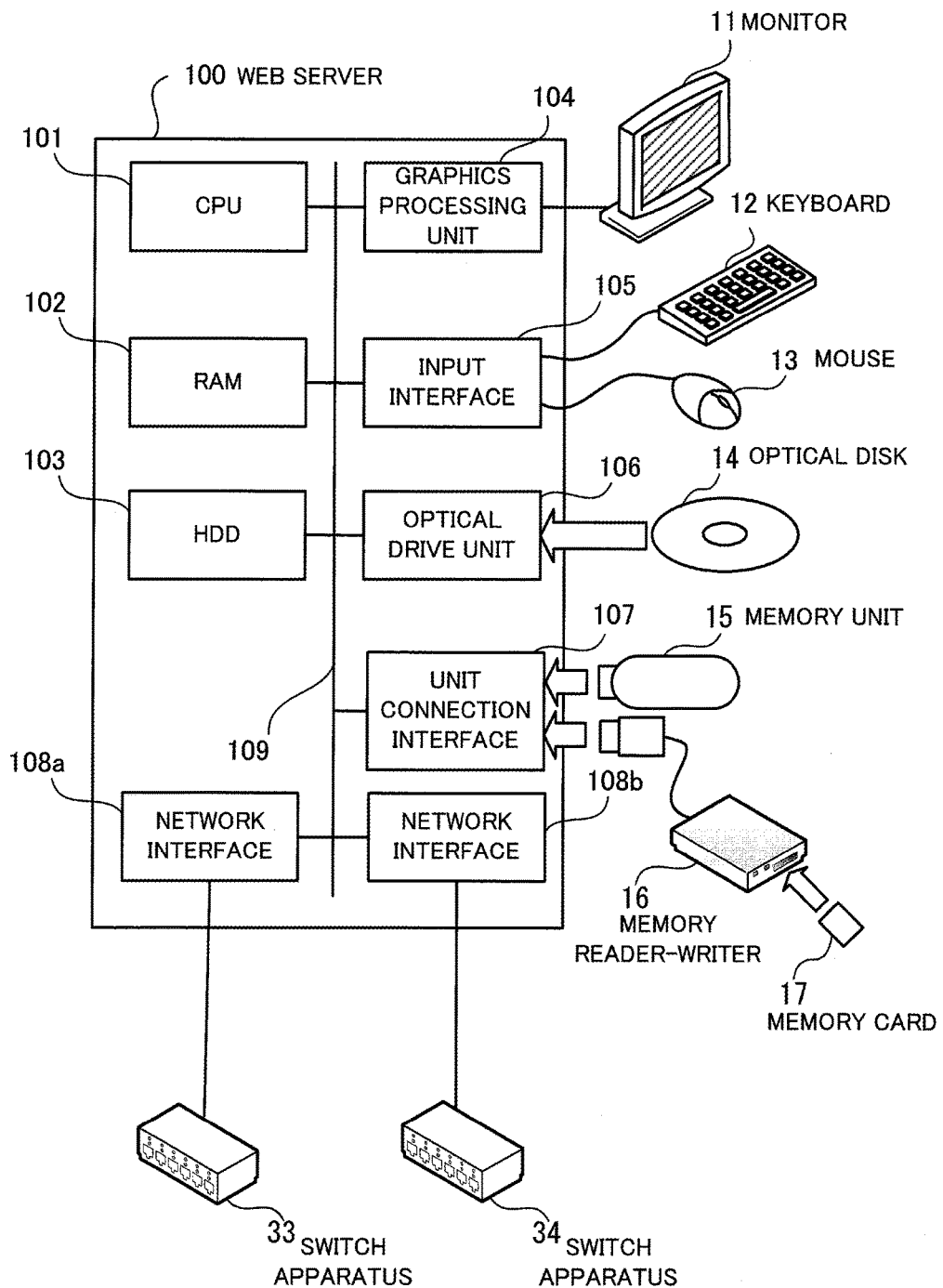
FIG. 6 illustrates an example of the hardware configuration of a Web server used in the second embodiment.

FIG. 6 illustrates an example of the hardware configuration of the Web server used in the second embodiment. The whole of the Web server 100 is controlled by a CPU 101. A RAM 102 and a plurality of peripheral units are connected to the CPU 101 via a bus 109. The number of CPUs included in the Web server 100 is not limited to one and may be greater than one. If the Web server 100 includes a plurality of CPUs, then the plurality of CPUs operate in connection with one another and control the whole of the Web server 100.

The RAM 102 is used as main storage of the Web server 100. The RAM 102 temporarily stores at least a part of an OS (Operating System) program or an application program executed by the CPU 101. In addition, the RAM 102 stores various pieces of data which the CPU 101 needs to perform a process.

The plurality of peripheral units connected to the bus 109 are a HDD 103, a graphics processing unit 104, an input interface 105, an optical drive unit 106, a unit connection interface 107, and network interfaces 108a and 108b.

The HDD 103 magnetically writes data to and reads out data from a built-in disk. The HDD 103 is used as auxiliary storage of the Web server 100. The HDD 103 stores the OS program, application programs, and various pieces of data. A semiconductor memory, such as a flash memory, may be used as auxiliary storage.

A monitor 11 is connected to the graphics processing unit 104. The graphics processing unit 104 displays an image on a screen of the monitor 11 in accordance with an instruction from the CPU 101. The monitor 11 is a display using a CRT (Cathode Ray Tube), a liquid crystal display, or the like.

A keyboard 12 and a mouse 13 are connected to the input interface 105. The input interface 105 transmits to the CPU 101a signal transmitted from the keyboard 12 or the mouse 13. The mouse 13 is an example of a pointing device and another pointing device, such as a touch panel, a tablet, a touch pad, or a track ball, may be used.

The optical drive unit 106 reads data recorded on an optical disk 14 by the use of a laser beam or the like. The optical disk 14 is a portable record medium on which recorded data can be read by the reflection of light. The optical disk 314 is a DVD (Digital Versatile Disc), a DVD-RAM, a CD-ROM (Compact Disc Read-Only Memory), a CD-R(Recordable)/RW (ReWritable), or the like.

The unit connection interface 107 is a communication interface used for connecting peripheral units to the Web server 100. For example, a memory unit 15 and a memory reader-writer 16 are connected to the unit connection interface 107. The memory unit 15 is a record medium having the function of communicating with the unit connection interface 107. The memory reader-writer 16 is a unit which writes data to or reads out data from a memory card 17. The memory card 17 is a card-type record medium.

The network interface 108a is connected to the switch apparatus 33. The network interface 108a transmits data to or receives data from the load balancer 32 via the switch apparatus 33.

The network interface 108b is connected to the switch apparatus 34. The network interface 108b transmits data to or receives data from the database server 200 via the switch apparatus 34.

By adopting the above hardware configuration, the processing functions in the second embodiment are realized. FIG. 6 illustrates an example of the hardware configuration of the Web server 100. However, the other Web servers 100a, 100b, etc., the database server 200, the load balancer 32, and the terminal apparatus 21, 22, 23, etc. are also realized by adopting the same hardware. Furthermore, the information processing apparatus 1 according to the first embodiment is also realized by adopting the same hardware that makes up the Web server 100 illustrated in FIG. 6.

The Web server 100 realizes the processing functions in the second embodiment by executing a program recorded in a computer-readable record medium. The program in which the contents of a process that are to be performed by the Web server 100 are described is recorded in various record media. For example, the program which is to be executed by the Web server 100 is stored in the HDD 103. The CPU 101 loads at least a part of the program stored in the HDD 103 into the RAM 102 and executes it. Furthermore, the program which is to be executed by the Web server 100 may be recorded on a portable record medium, such as the optical disk 14, the memory unit 15, or the memory card 17. The program recorded on a portable record medium is installed in the HDD 103 and then is executed, under the control of, for example, the CPU 101. In addition, the CPU 101 may read out the program directly from a portable record medium and execute it. A record medium in which the program is recorded does not include a transitory propagating signal itself.

In order to circulate the program, portable record media, such as the optical disk 14, the memory unit 15, or the memory card 17, in which the program is recorded are sold. Alternatively, the program may be stored in a storage unit of a server computer and be transferred via a network from the server computer to the Web server 100. If the Web server 100 acquires the program via a network, the Web server 100 stores the program it acquires in, for example, the HDD 103. The CPU 101 of the Web server 100 then executes the program stored in the HDD 103. Furthermore, each time a part of the program is transferred from the server computer, the CPU 101 of the Web server 100 may perform processes in turn in compliance with the part of the program the Web server 100 receives.

The function of each server regarding index update in the second embodiment will now be described.

Figure 7:
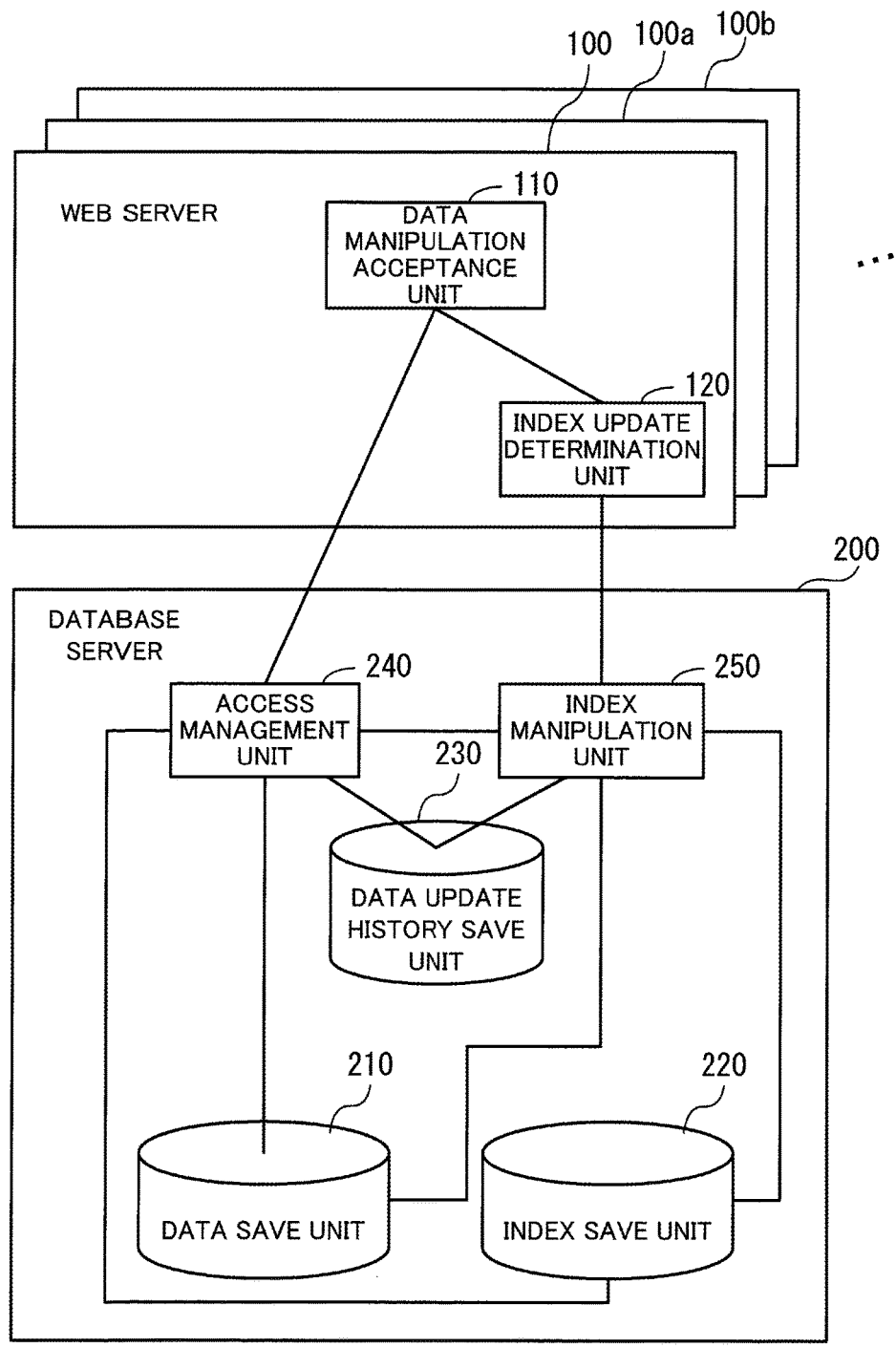
FIG. 7 is a functional block diagram of each server in the second embodiment.

FIG. 7 is a functional block diagram of each server in the second embodiment. The Web server 100 includes a data manipulation acceptance unit 110 and an index update determination unit 120.

The data manipulation acceptance unit 110 accepts instructions from the terminal apparatus 21, 22, 23, etc. to manipulate data in the database included in the database server 200. Data manipulation instructions are data update instructions, data retrieval instructions, or the like. Data update instructions are data addition request, a data deletion request, or a data change request. When the data manipulation acceptance unit 110 accepts data update instructions, the data manipulation acceptance unit 110 transmits a data update request to the database server 200 and transmits data update notice to the index update determination unit 120. Furthermore, when the data manipulation acceptance unit 110 accepts data retrieval instructions, the data manipulation acceptance unit 110 transmits a retrieval request including a retrieval key to the database server 200.

When the index update determination unit 120 receives data update notice from the data manipulation acceptance unit 110, the index update determination unit 120 determines whether to perform an index update process. In the second embodiment the index update determination unit 120 determines to perform an index update process with a determined probability. For example, the index update determination unit 120 generates random numbers. When a numeric value, of all numeric values that can be generated as random numbers, corresponding to the determined probability is generated as a random number, the index update determination unit 120 determines to perform an index update process. If an index update process is performed with a probability of, for example, 0.01 (1%), then the index update determination unit 120 generates a random number in the range of 0 to 99. A random number generated is a uniform random number and each of the numeric values "0 to 99" is generated with an equal probability.

When a specific numeric value ("0", for example) in the range of 0 to 99 is generated, the index update determination unit 120 determines to perform an index update process. In addition, when a numeric value (one of 1 to 99, for example) other than the specific numeric value is generated, the index update determination unit 120 determines not to perform an index update process.

When the index update determination unit 120 determines to update the index, the index update determination unit 120 transmits an index update request to the database server 200.

FIG. 7 typically illustrates the function of the Web server 100. However, the other Web servers 100a, 100b, etc. also have the same function.

The database server 200 includes a data save unit 210, an index save unit 220, a data update history save unit 230, an access management unit 240, and an index manipulation unit 250.

The data save unit 210 stores data to be managed. For example, a part of a storage area of the RAM 102 or the HDD 103 is used as the data save unit 210.

The index save unit 220 stores an index to data stored in the data save unit 210. For example, a part of the storage area of the RAM 102 or the HDD 103 is used as the index save unit 220.

The data update history save unit 230 stores an update history of data. For example, a part of the storage area of the RAM 102 or the HDD 103 is used as the data update history save unit 230. An update history of data stored in the data update history save unit 230 is cleared when the contents of a change in the data are reflected in the index.

The access management unit 240 performs processes in response to data update requests or data retrieval requests transmitted from the Web servers 100, 100a, 100b, etc. For example, when the access management unit 240 receives a data update request, the access management unit 240 updates data stored in the data save unit 210. If the addition of data is designated in a data update request, then the access management unit 240 generates new data ID and stores in the data save unit 210 the data to which the generated data ID is given. Furthermore, if the deletion of data is designated in a data update request, then the access management unit 240 deletes the data from the data save unit 210. In addition, if a change in the value of data is designated in a data update request, then the access management unit 240 changes the value of the data stored in the data save unit 210.

When the access management unit 240 completes processing on the data save unit 210 corresponding to a data update request, the access management unit 240 returns a processing result to a Web server which transmits the data update request. In addition, the access management unit 240 stores in the data update history save unit 230 the contents of a process which it performs in response to the data update request.

Moreover, when the access management unit 240 receives a data retrieval request, the access management unit 240 retrieves data from the data save unit 210. For example, when the access management unit 240 receives a data retrieval request, the access management unit 240 determines whether or not an update history which is not yet reflected in the index is stored in the data update history save unit 230. If an update history which is not yet reflected in the index is stored in the data update history save unit 230, then the access management unit 240 transmits an index update request to the index manipulation unit 250. When the access management unit 240 receives a response indicative of the completion of index update from the index manipulation unit 250, the access management unit 240 retrieves the data by the use of an index stored in the index save unit 220. For example, the access management unit 240 specifies data ID for the data corresponding to a retrieval key included in the data retrieval request by the use of the index. The access management unit 240 then extracts from the data save unit 210 the data corresponding to the specified data ID. The access management unit 240 then transmits the extracted data to a Web server which transmits the data retrieval request.

The index manipulation unit 250 manages an index stored in the index save unit 220. For example, when the index manipulation unit 250 receives an index update request from the access management unit 240 or a Web server, the index manipulation unit 250 updates the index. In order to update the index, the index manipulation unit 250 acquires an update history of data from the data update history save unit 230. The index manipulation unit 250 then updates the index on the basis of the update history of the data. For example, if an update history indicates the addition of data, then the index manipulation unit 250 extracts the added data from the data save unit 210 and puts an index value of the data into a proper location in the index. Furthermore, if an update history indicates the deletion of data, then the index manipulation unit 250 nullifies an index value corresponding to the deleted data. When the index manipulation unit 250 completes index update, the index manipulation unit 250 informs of the completion of index update the access management unit 240 or the Web server which transmits the index update request.

Lines by which the components illustrated in FIG. 7 are connected indicate a part of a communication path and a communication path other than that indicated in FIG. 7 may also be set. Furthermore, a function obtained by combining the data save unit 210 and the index save unit 220 illustrated in FIG. 7 is an example of the database 1a in the first embodiment illustrated in FIG. 1. The data update history save unit 230 illustrated in FIG. 7 is an example of the update history storage unit 1b in the first embodiment illustrated in FIG. 1. The index update determination unit 120 illustrated in FIG. 7 is an example of a function including the determination unit 1d and the output unit 1e in the first embodiment illustrated in FIG. 1. A function realized by cooperation between the data manipulation acceptance unit 110 and the access management unit 240 illustrated in FIG. 7 is an example of a function obtained by combining the data update unit 1c and the retrieval unit 1g in the first embodiment illustrated in FIG. 1. The index manipulation unit 250 illustrated in FIG. 7 is an example of the index update unit 1f in the first embodiment illustrated in FIG. 1.

A data structure in each storage unit in the database server 200 will now be described.

Figure 8:
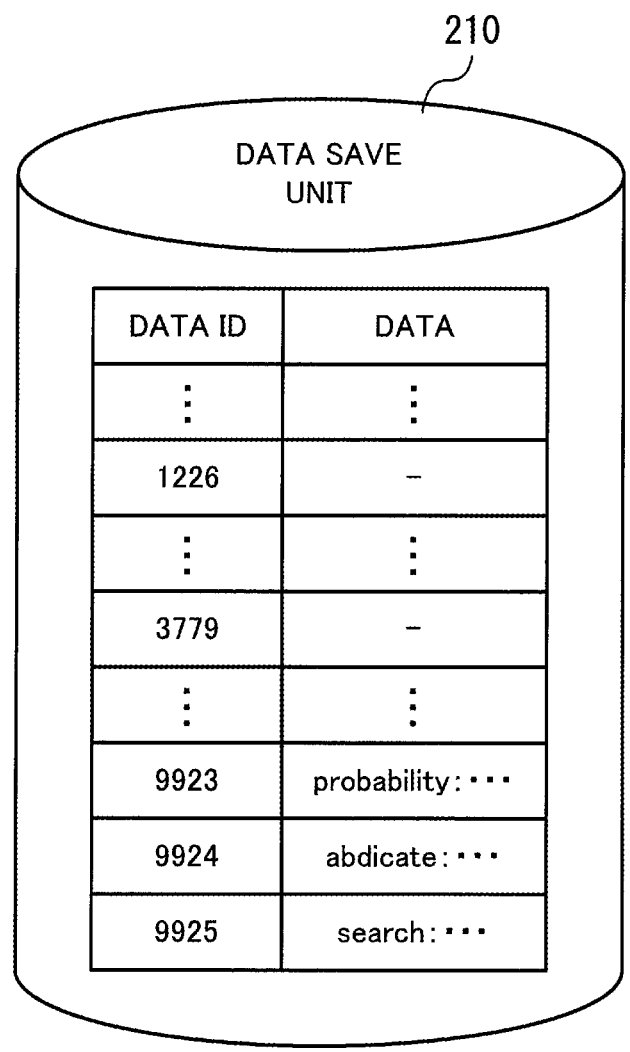
FIG. 8 illustrates an example of a data structure in a data save unit.

FIG. 8 illustrates an example of a data structure in the data save unit. Data associated with data ID is stored in the data save unit 210. A combination of data ID and data forms a record. Data includes a character string used as an index value. For example, an item name of data is set at the head of the data and the item name is used as an index value. In a record in which data is deleted, only data ID is left and a data area is empty.

A data structure in the index save unit 220 will now be described.

Figure 9:
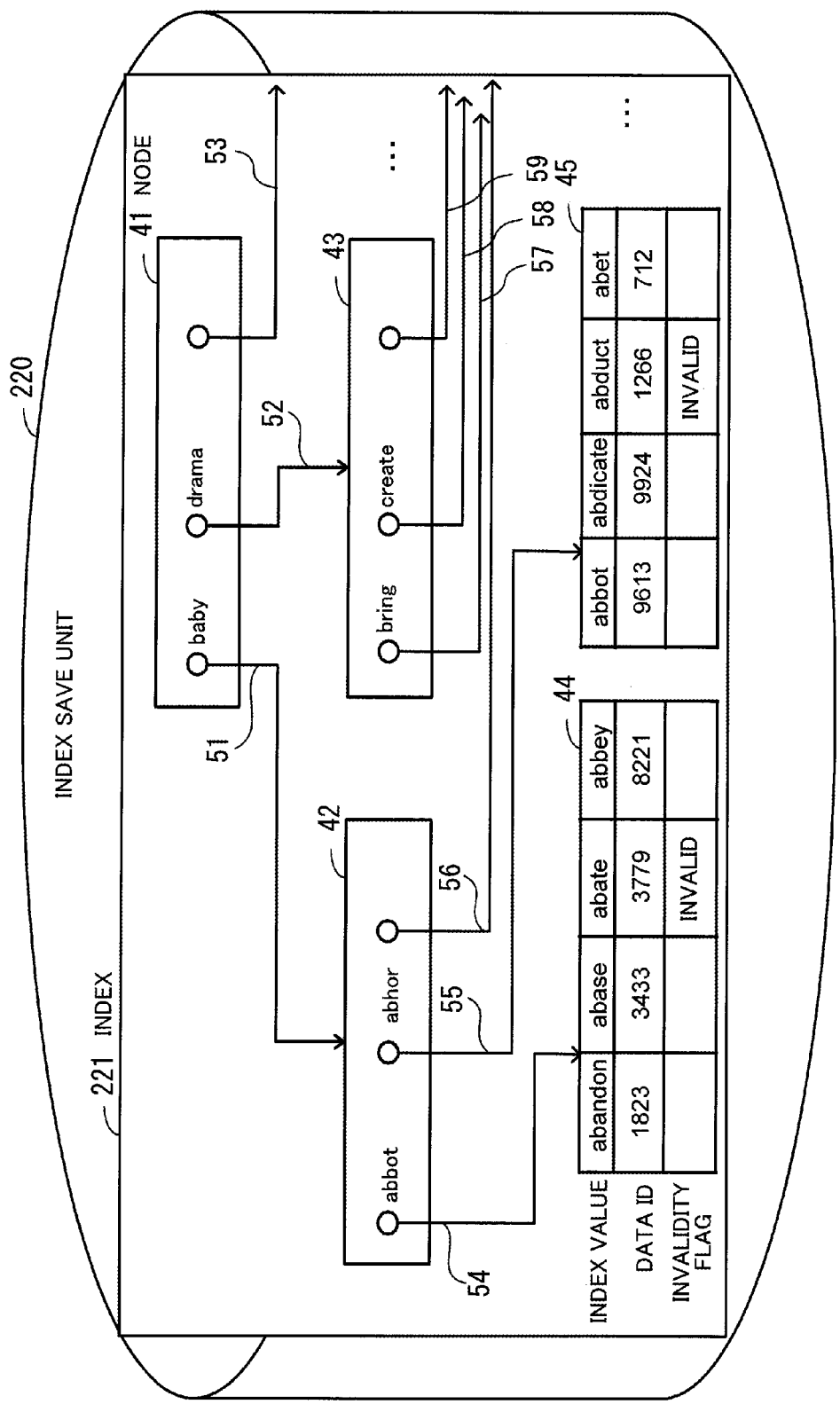
FIG. 9 illustrates an example of a data structure in an index save unit.

FIG. 9 illustrates an example of a data structure in the index save unit. FIG. 9 illustrates an example of an index structured by the use of a B-Tree. A B-Tree is a balanced tree with many branches.

An index 221 has a tree structure including nodes 41, 42, 43, 44, 45, etc. The node 41 is a root node. Furthermore, the nodes 44 and 45 are leaf nodes.

A branch extends from each of the nodes other than the leaf nodes and a lower node is connected to its tip. A maximum value is set for the number of branches at a node. In addition, a node has keys the number of which is smaller by one than that of branches at the node. In the example of FIG. 9, for example, it is assumed that a maximum of 3 branches can be generated at each node.

The root node 41 has the keys "baby" and "drama". Furthermore, three branches 51 through 53 are generated at the node 41. The branch 51 is connected to the node 42. The node 42 and its descendant nodes hold index values which come before the key "baby" in alphabetical order. The branch 52 is connected to the node 43. The node 43 and its descendant nodes hold index values which come after the key "baby" before the key "drama" in alphabetical order. The branch 53 is connected to a node (not illustrated). The node to which the branch 53 is connected and its descendant nodes hold index values which come after the key "drama" in alphabetical order.

The node 42 has the keys "abbot" and "abhor". Furthermore, three branches 54 through 56 are generated at the node 42. The branch 54 is connected to the leaf node 44. The node 44 holds index values which come before the key "abbot" in alphabetical order. The branch 55 is connected to the leaf node 45. The node 45 holds index values which come after the key "abbot" before the key "abhor" in alphabetical order. The branch 56 is connected to a leaf node (not illustrated). The node to which the branch 56 is connected holds index values which come after the key "abhor" before the key "drama" in alphabetical order.

The node 43 has the keys "bring" and "create". Furthermore, three branches 57 through 59 are generated at the node 43. Each of the branches 57 through 59 is connected to a leaf node (not illustrated).

Each of the leaf nodes 44, 45, etc. includes areas for setting data ID and an invalidity flag associated with an index value. Index values are sorted, for example, in alphabetical order. An identifier (data ID) given to data corresponding to an index value is set in a data ID setting area. A flag (invalidity flag) which indicates that an index value corresponding to deleted data is invalid is set in an invalidity flag setting area.

If an index value is added to the index 221 having the above data structure, index values are sorted. In addition, in order to increase efficiency in retrieving data by the use of the index 221, the tree structure is rebuilt, for example, so that the number of index values held by each of nodes to which plural branches generated at a node are connected and its descendant nodes will be equal. When the index 221 is updated, optimization is realized. That is to say, as stated above, index values are sorted and the tree structure is rebuilt. As a result, if the index 221 is updated with great frequency, a processing load on the database server 200 is excessive. This causes delay in a data retrieval process or the like. For example, if the index 221 is updated each time a data update process is performed, a processing load may be excessive. Therefore, in the second embodiment whether to perform an index update process is stochastically determined at data update time.

If data update is performed to delete data, an invalidity flag is set in an invalidity flag setting area corresponding to data ID of the data.

A data structure in the data update history save unit 230 will now be described.

Figure 10:
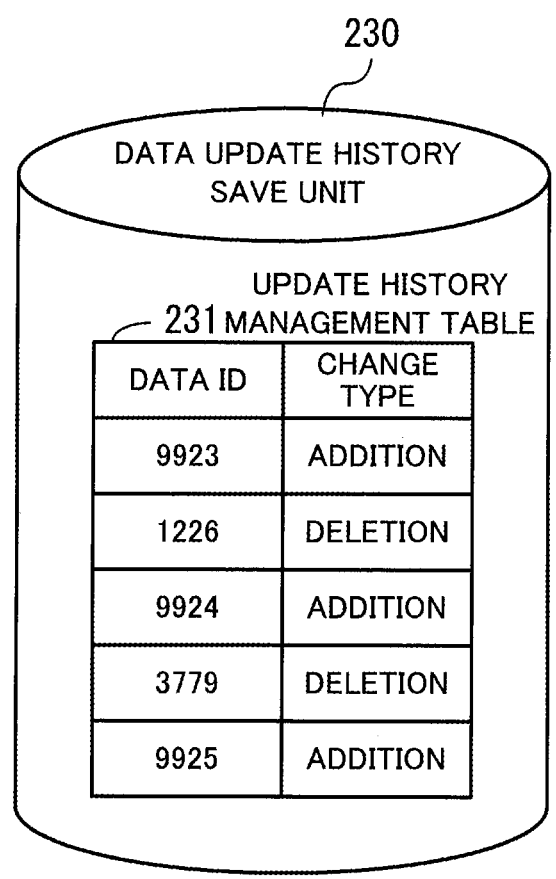
FIG. 10 illustrates an example of a data structure in a data update history save unit.

FIG. 10 illustrates an example of a data structure in the data update history save unit. The data update history save unit 230 stores an update history management table 231. The update history management table 231 includes Data ID and Change Type columns.

Data ID of data, of data after a change, for which a change result is not reflected in an index is set in the Data ID column. A change type associated with data ID of data after a change is set in the Change Type column. "Addition" or "deletion" is set in the Change Type column as information indicative of the contents of a change. If a change is made in data, the contents of the change in the data are expressed by a combination of data addition and data deletion. A combination of data ID and a change type form a record of an update history.

An index update process is performed according to records registered in the update history management table 231. For example, an index value of added data is put into a proper location in the index 221 on the basis of a record in which the change type "addition" is set. Furthermore, an invalidity mark is set at the location of data ID of deleted data in a leaf node in the index 221 in which an index value of the deleted data is set on the basis of a record in which the change type "deletion" is set.

A procedure for a data update process will now be described.

Figure 11:
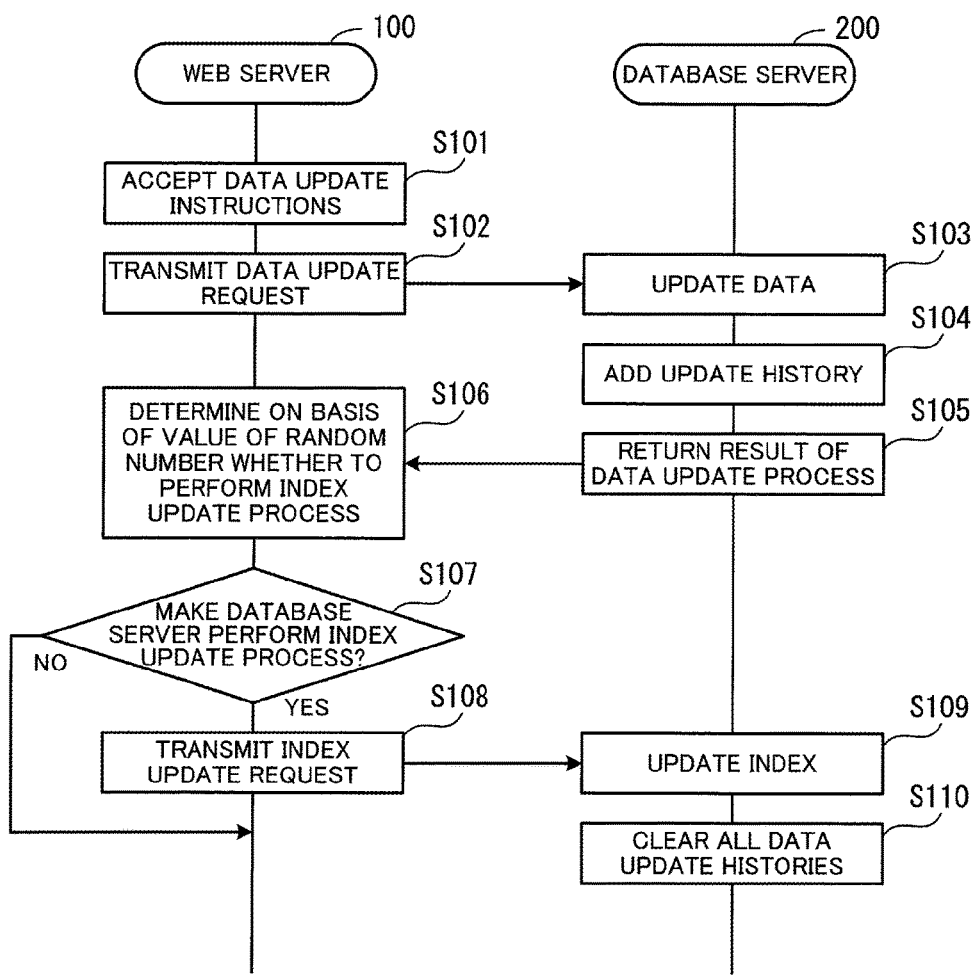
FIG. 11 is a sequence diagram of an example of a procedure for a data update process.

FIG. 11 is a sequence diagram of an example of a procedure for a data update process. A process indicated in FIG. 11 will be described in order of step number.

(Step S101) The data manipulation acceptance unit 110 of the Web server 100 accepts data update instructions from a terminal apparatus.

(Step S102) The data manipulation acceptance unit 110 transmits a data update request corresponding to the data update instructions to the database server 200.

(Step S103) The access management unit 240 of the database server 200 updates data in the data save unit 210 in response to the data update request.

(Step S104) The access management unit 240 adds an update history to the data update history save unit 230. For example, if new data is added, then the access management unit 240 newly registers in the update history management table 231a record including data ID of the added data and the change type "addition". Furthermore, if data is deleted, then the access management unit 240 newly registers in the update history management table 231a record including data ID of the deleted data and the change type "deletion". In addition, if data is changed, then the access management unit 240 newly registers in the update history management table 231a record including data ID of the changed data and the change type "addition" and a record including the data ID of the changed data and the change type "deletion".

(Step S105) The access management unit 240 returns the result of a data update process to the Web server 100.

(Step S106) The data manipulation acceptance unit 110 sends data update notice to the index update determination unit 120. The index update determination unit 120 stochastically determines whether to make the database server 200 perform an index update process. For example, the index update determination unit 120 generates a random number and determines on the basis of the value of the random number whether to perform an index update process.

(Step S107) If the index update determination unit 120 determines to make the database server 200 perform an index update process, then the data manipulation acceptance unit 110 proceeds to step S108. If the index update determination unit 120 determines not to make the database server 200 perform an index update process, then the data manipulation acceptance unit 110 terminates the process.

(Step S108) If the index update determination unit 120 determines to make the database server 200 perform an index update process, then the data manipulation acceptance unit 110 transmits an index update request to the database server 200.

(Step S109) The index manipulation unit 250 of the database server 200 updates the index 221 stored in the index save unit 220. For example, the index manipulation unit 250 extracts data update histories one by one from the data update history save unit 230. The index manipulation unit 250 then updates the index 221 on the basis of an extracted update history. For example, if a change type included in the extracted update history is "addition", then the index manipulation unit 250 acquires from the data save unit 210 data corresponding to data ID included in the update history. The index manipulation unit 250 then extracts an index value from the acquired data. Furthermore, the index manipulation unit 250 adds a combination of the index value and the data ID of the acquired data to a location in the index 221 corresponding to the extracted index value. Furthermore, if a change type included in an extracted update history is "deletion", then the index manipulation unit 250 sets an invalidity flag in an invalidity flag setting area in the index 221 corresponding to an extracted index value.

When the index manipulation unit 250 completes reflecting all the update histories in the index 221, the index manipulation unit 250 rebuilds the data structure of the index 221.

(Step S110) When the index manipulation unit 250 completes update of the index 221, the index manipulation unit 250 deletes (clears) all the update histories from the data update history save unit 230.

As has been described, at data update time a random number is used for stochastically determining whether to perform an index update process. As a result, if many data updates are performed in succession, index update processes are performed between data updates at proper intervals. This prevents the amount of history information which is not yet reflected in the index 221 from becoming excessive.

A process at data retrieval time will now be described.

Figure 12:
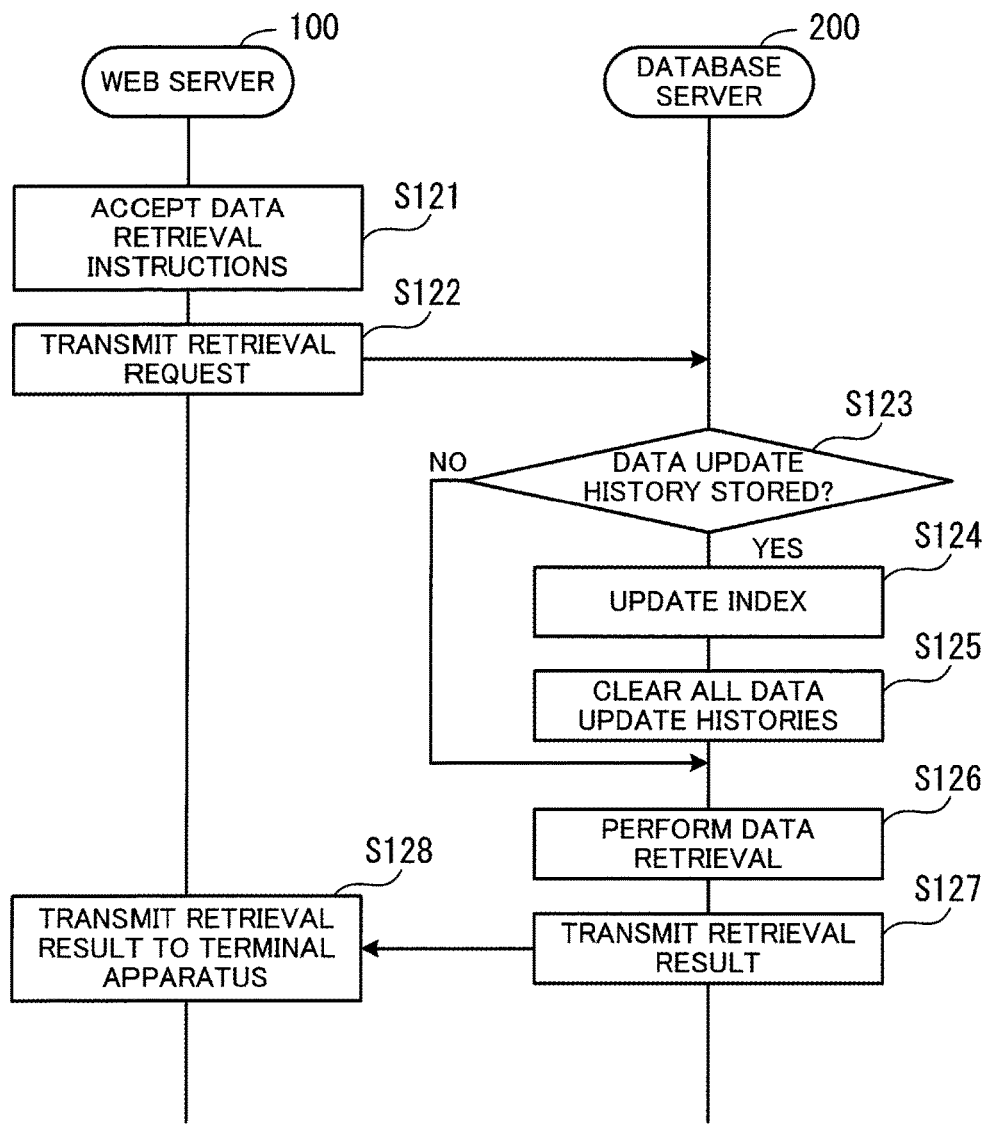
FIG. 12 is a sequence diagram of a procedure for a process at data retrieval time.

FIG. 12 is a sequence diagram of a procedure for a process at data retrieval time. A process indicated in FIG. 12 will be described in order of step number.

(Step S121) The data manipulation acceptance unit 110 of the Web server 100 accepts data retrieval instructions from a terminal apparatus.

(Step S122) The data manipulation acceptance unit 110 transmits a retrieval request to the database server 200.

(Step S123) The access management unit 240 of the database server 200 refers to the data update history save unit 230 and determines whether or not there is an update history which is not yet reflected in the index 221. If there is an update history which is not yet reflected in the index 221, then the access management unit 240 proceeds to step S124. If there is no update history which is not yet reflected in the index 221, then the access management unit 240 proceeds to step S126.

(Step S124) If there is an update history which is not yet reflected in the index 221, then the access management unit 240 transmits an index update request to the index manipulation unit 250. The index manipulation unit 250 updates the index 221 in response to the index update request. The details of an index update process are described in the above step S109.

(Step S125) When the index manipulation unit 250 completes update of the index 221, the index manipulation unit 250 deletes (clears) all update histories from the data update history save unit 230. The index manipulation unit 250 then transmits to the access management unit 240 a response indicative of completion of index update.

(Step S126) When the access management unit 240 receives the response indicative of completion of the index update process, the access management unit 240 performs data retrieval. For example, the access management unit 240 retrieves an index value corresponding to a retrieval key included in the retrieval request from the index 221 stored in the index save unit 220. If the access management unit 240 finds an index value corresponding to the retrieval key, then the access management unit 240 acquires data ID associated with the index value. The access management unit 240 then acquires from the data save unit 210 data corresponding to the acquired data ID.

(Step S127) The access management unit 240 transmits to the Web server 100 a retrieval result including the data acquired by the data retrieval.

(Step S128) The Web server 100 transmits the retrieval result to the terminal apparatus which transmits the data retrieval instructions.

Data retrieval is performed in this way. If at data retrieval time there is history information which is not yet reflected in the index 221, then the index 221 is updated so that the history information will be reflected in the index 221. As indicated in FIG. 11, the index 221 is updated intermittently only at data update time. This prevents an excessive amount of history information which is not yet reflected in the index 221 from remaining at data retrieval time. Accordingly, even if an index update process is performed at data retrieval time, a situation in which a response to a data retrieval request takes an extremely long time is averted.

Figure 13:
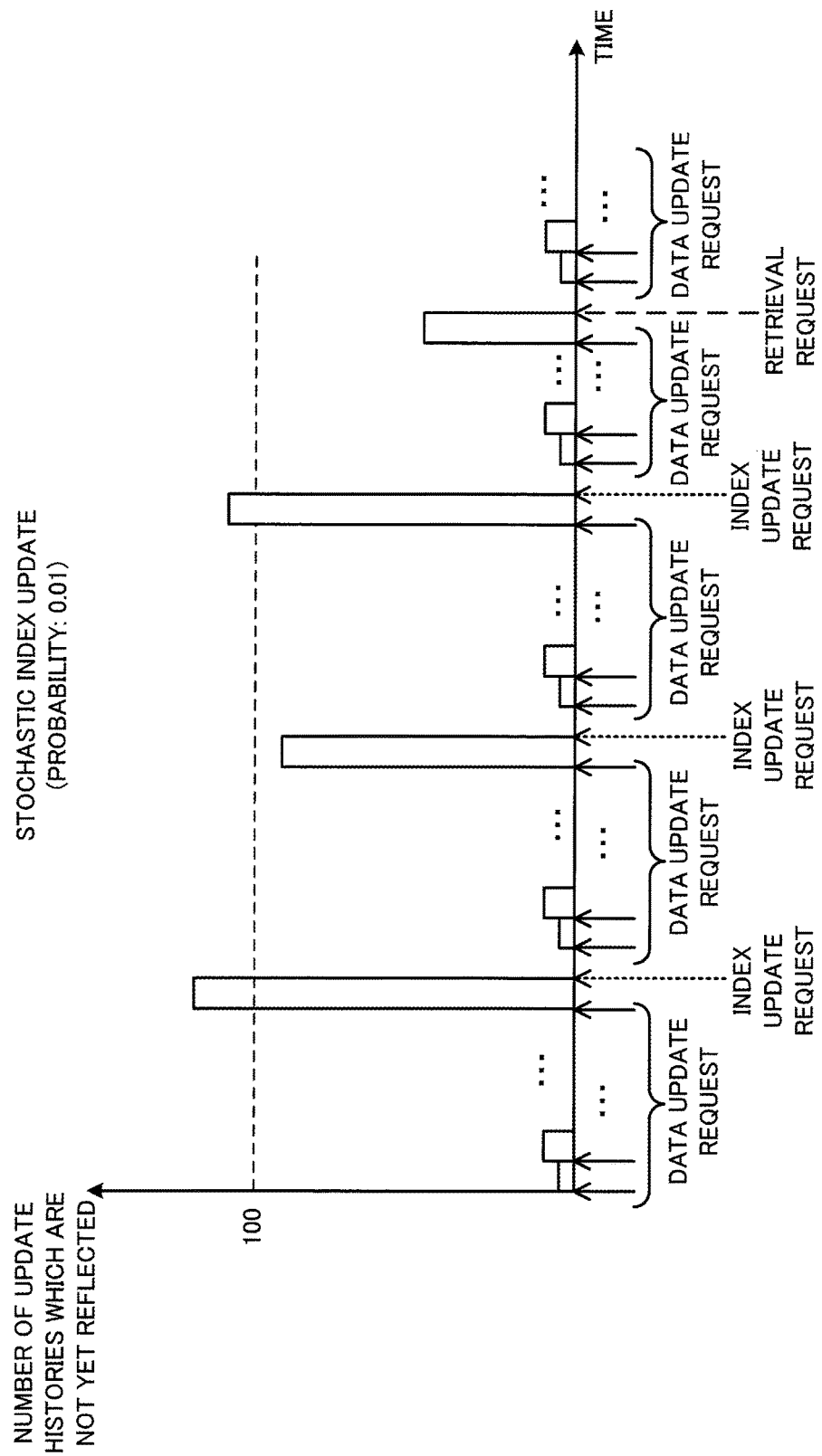
FIG. 13 indicates an example of a change in the number of update histories which are not yet reflected in an index.

FIG. 13 indicates an example of a change in the number of update histories which are not yet reflected in the index. In FIG. 13, a horizontal axis indicates time and a vertical axis indicates the number of update histories which are not yet reflected in the index 221. In the example of FIG. 13, it is assumed that an index update process is performed at data update time with a probability of 0.01 (1%).

The number of update histories which are not yet reflected in the index 221 becomes 0 when the database server 200 receives an index update request and when the database server 200 receives a retrieval request. The number of update histories which are not yet reflected in the index 221 increases by 1 in the other period each time the database server 200 receives a data update request.

In the example of FIG. 13, an index update request is inputted at data update time with a probability of 0.01. As a result, the number of update histories which are not yet reflected in the index 221 is, at the most, a little more than 100. This means that even if data update is performed, for example, tens of thousands of times after the last retrieval request before this retrieval request, the number of update histories which are reflected in the index 221 at retrieval request time is, at the most, a little more than 100. This indicates that a situation in which a response to a retrieval request takes an extremely long time is averted.

Furthermore, in the second embodiment each of the Web servers 100, 100*a*, 100*b*, etc. stochastically determines whether to perform an index update process. Accordingly, each of the Web servers 100, 100*a*, 100*b*, etc. can transmit an index update request without using information indicative of how many data update requests are made by the other Web servers. As a result, processing by the Web servers 100, 100*a*, 100*b*, etc. for outputting an index update request is very simple and an increase in processing load caused by outputting an index update request is minimized.

(Third Embodiment)

A third embodiment will now be described. In the third embodiment a probability (update probability) with which an index update process is performed is changed according to the speed of communication with a terminal apparatus.

Figure 14:
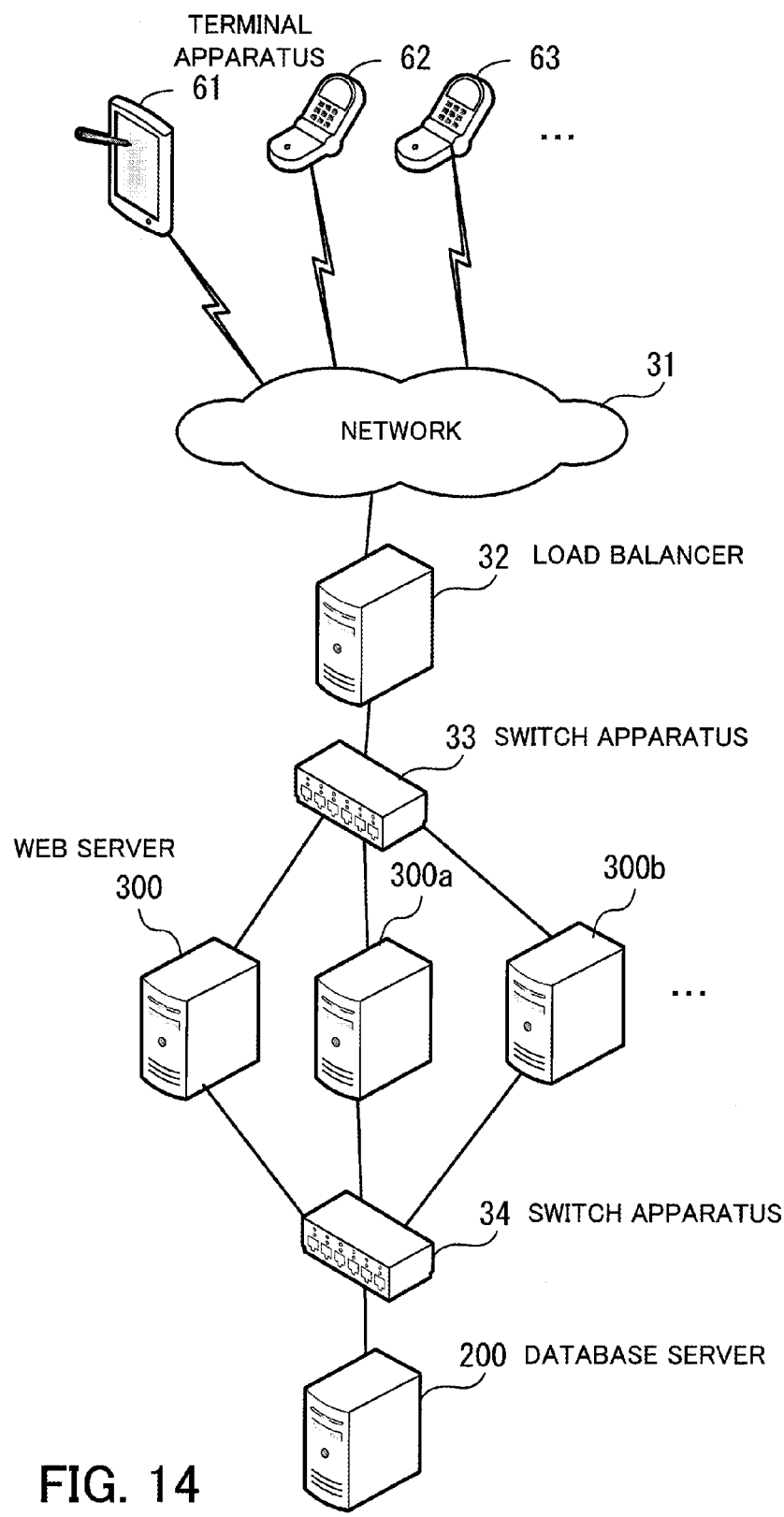
FIG. 14 illustrates an example of the structure of a system according to a third embodiment.

FIG. 14 illustrates an example of the structure of a system according to the third embodiment. In FIG. 14, components which are the same as those included in the system according to the second embodiment illustrated in FIG. 5 are marked with the same numerals and descriptions of them will be omitted. In the third embodiment terminal apparatus 61, 62, 63, etc. are connected to a network 31 by radio. The terminal apparatus 61, 62, 63, etc. are, for example, mobile communication terminal apparatus.

Web servers 300, 300*a*, 300*b*, etc. perform processes in response to requests from the terminal apparatus 61, 62, 63, etc. For example, if the Web servers 300, 300*a*, 300*b*, etc. receive requests to manipulate data managed by a database server 200, the Web servers 300, 300*a*, 300*b*, etc. give the database server 200 instructions to update or retrieve a record in a database.

In the third embodiment, if each of the Web servers 300, 300*a*, 300*b*, etc. updates a record in the database included in the database server 200, it determines an index update probability according to the speed of communication with a terminal apparatus which transmits a data update request. Each of the Web servers 300, 300*a*, 300*b*, etc. then determines on the basis of a stochastic judgment by a random number whether to update an index.

The hardware configuration of the Web servers 300, 300*a*, 300*b*, etc. is the same as that of the Web server 100 in the second embodiment illustrated in FIG. 6.

Figure 15:
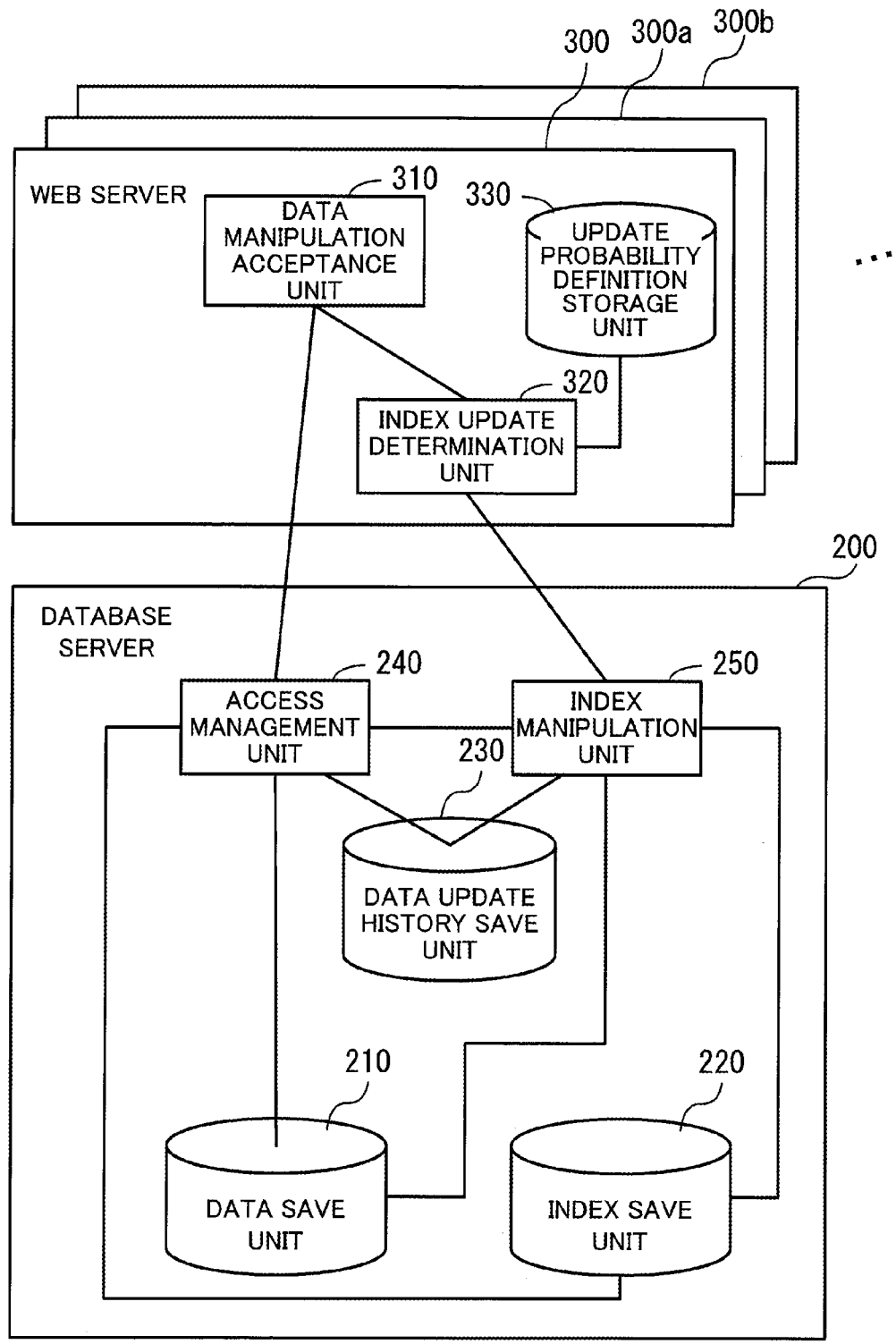
FIG. 15 is a functional block diagram of each server in the third embodiment.

FIG. 15 is a functional block diagram of each server in the third embodiment. The Web servers 300, 300*a*, 300*b*, etc. in the third embodiment differ in function from the Web servers 100, 100*a*, 100*b*, etc. in the second embodiment. The database server 200 in the third embodiment is equal in function to the database server 200 in the second embodiment.

The Web server 300 includes a data manipulation acceptance unit 310, an index update determination unit 320, and an update probability definition storage unit 330. The data manipulation acceptance unit 310 is equal in function to the data manipulation acceptance unit 110 (see FIG. 7) in the second embodiment. Furthermore, the third embodiment differs from the second embodiment in that the update probability definition storage unit 330 is added.

The update probability definition storage unit 330 stores information by which a probability with which an index update process is performed is defined. This probability corresponds to the speed of a line used for communication with a terminal apparatus. For example, a part of a storage area of a RAM or a HDD is used as the update probability definition storage unit 330.

The index update determination unit 320 has not only the function which the index update determination unit 120 (see FIG. 7) in the second embodiment has but also an update probability determination function. The update probability determination function is as follows. When the index update determination unit 320 receives data update notice from the data manipulation acceptance unit 310, the index update determination unit 320 refers to the update probability definition storage unit 330 and determines an update probability corresponding to the speed of communication with a terminal apparatus which transmits a data update request. In accordance with the determined update probability the index update determination unit 320 then determines whether to perform an index update process.

A data structure in the update probability definition storage unit 330 will now be described.

Figure 16:
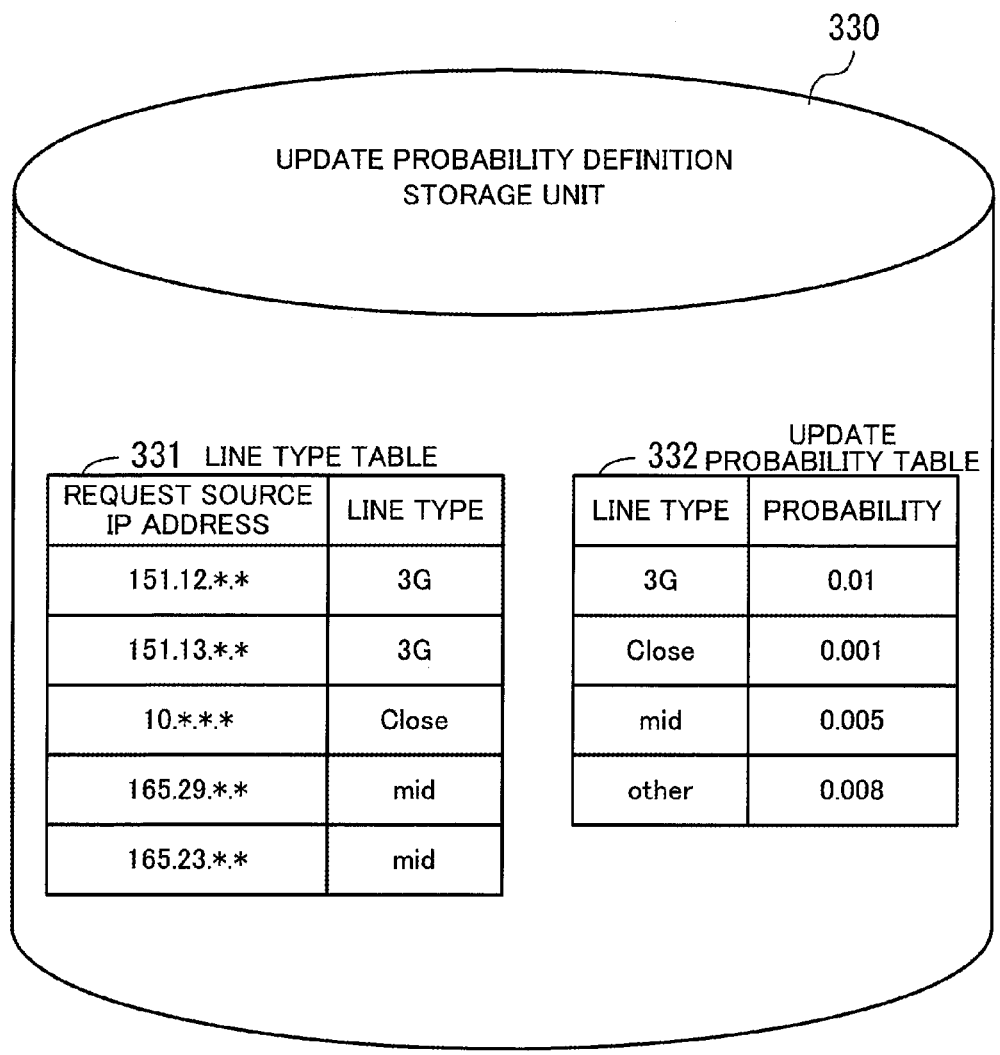
FIG. 16 illustrates an example of a data structure in an update probability definition storage unit.

FIG. 16 illustrates an example of a data structure in the update probability definition storage unit. A line type table 331 and an update probability table 332 are stored in the update probability definition storage unit 330.

The line type table 331 includes Request Source IP Address and Line Type columns. An IP address of a terminal apparatus which transmits data update instructions is set in the Request Source IP Address column. A part of an IP address can be expresses with the wild card "*" in the Request Source IP Address column. This wild card means an arbitrary numeric value. The type of a communication line between the Web server 300 and a terminal apparatus whose IP address is set in the Request Source IP Address column is set in the Line Type column.

By referring to the line type table 331, the type of a communication line between the Web server 300 and a terminal apparatus which transmits data update instructions is recognized on the basis of an IP address of the terminal apparatus.

The update probability table 332 includes Line Type and Probability columns. The type of a communication line between the Web server 300 and a terminal apparatus whose IP address is set in the Request Source IP Address column is set in the Line Type column. A probability with which an index update process is performed in the case of data update instructions being received via a communication line of a corresponding type is set in the Probability column. For example, a higher probability is set for a line which realizes a higher communication speed.

By referring to the update probability table 332, an update probability corresponding to each line type is recognized.

A data update process in the third embodiment will now be described.

Figure 17:
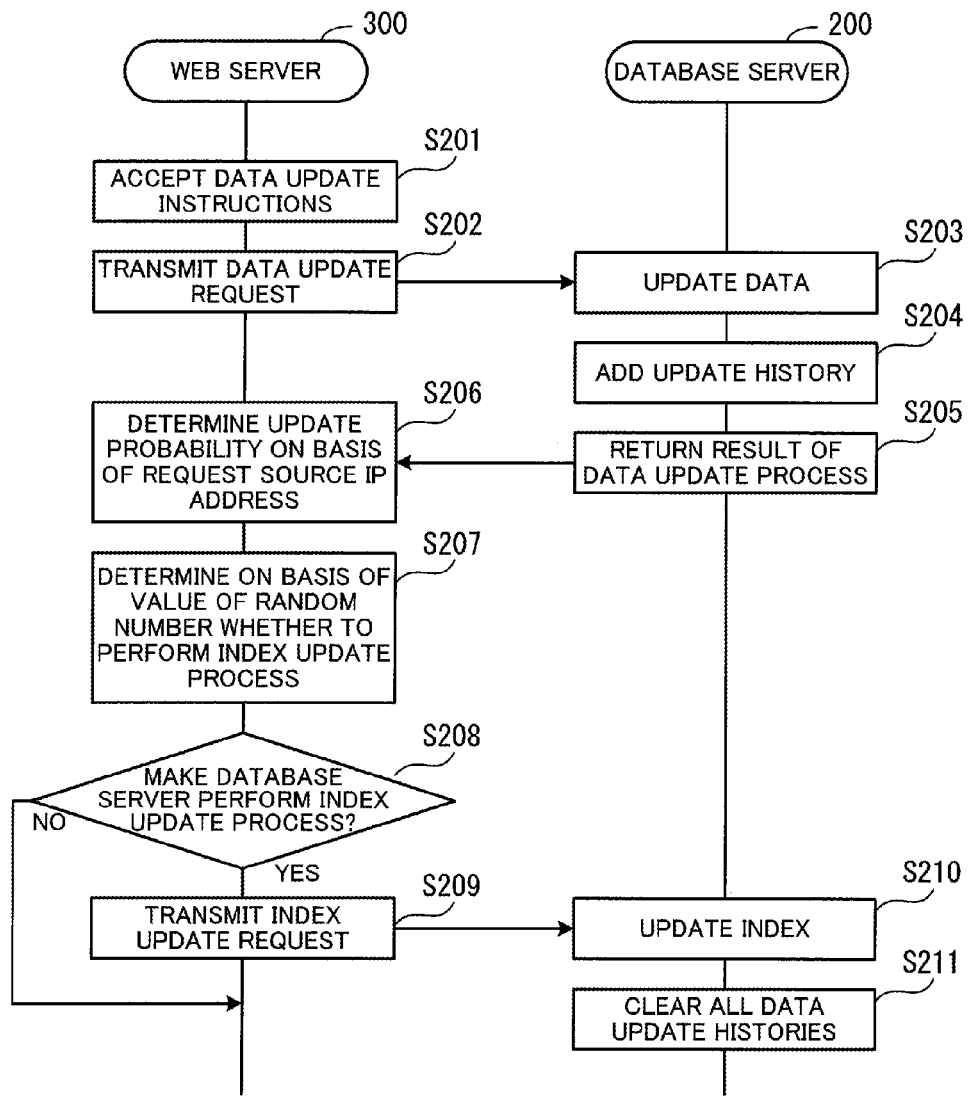
FIG. 17 is a sequence diagram of an example of a procedure for a data update process in the third embodiment.

FIG. 17 is a sequence diagram of an example of a procedure for a data update process in the third embodiment. Steps S201 through S205 and S207 through S211 indicated in FIG. 17 are the same as steps S101 through S110, respectively, in the second embodiment indicated in FIG. 11. The third embodiment differs from the second embodiment in that step S206 is performed. Accordingly, step S206 will be described.

(Step S206) When the index update determination unit 320 receives a data update result from the database server 200, the index update determination unit 320 determines an update probability on the basis of a request source IP address. For example, the index update determination unit 320 extracts a request source IP address from a packet used for transmitting data update instructions. The index update determination unit 320 then searches through the Request Source IP Address column in the line type table 331 with the extracted request source IP address as a retrieval key. If the appropriate request source IP address exists, then the index update determination unit 320 extracts a line type corresponding to the request source IP address from the line type table 331. The index update determination unit 320 then searches through the Line Type column in the update probability table 332 with the extracted line type as a retrieval key. The index update determination unit 320 extracts a probability corresponding to the appropriate line type from the update probability table 332. The index update determination unit 320 then determines the extracted probability as an update probability to be applied to this process.

After that, in step S207 whether to perform an index update process is determined on the basis of the determined update probability.

An index update probability can be changed in this way according to the speed of a line to which a terminal apparatus is connected. For example, a higher index update probability is set for a higher line speed. As a result, as a line speed used by a user increases, response time at data retrieval time becomes shorter.

That is to say, if a user uses a terminal apparatus and inputs data update instructions via a high-speed line, then the frequency with which an index update process is performed increases. As a result, the number of update histories stored in the data update history save unit 230 is controlled. It is assumed that after that the user inputs data retrieval instructions. The number of update histories is controlled, so index update is completed in a short period of time. Accordingly, response time at data retrieval time is short. This prevents a situation in which in spite of the use of a high-speed line, response time at data retrieval time is long and in which service quality that the user demands is not realized.

On the other hand, if a user uses a terminal apparatus and inputs data update instructions via a low-speed line, then the frequency with which an index update process is performed decreases. As a result, the number of update histories stored in the data update history save unit 230 increases, but a processing load caused by performing an index update process is lightened. It is assumed that after that the user inputs data retrieval instructions. The number of update histories is large and there may be cases where compared with cases where a high-speed line is used, response time at data retrieval time is long. However, if a low-speed line is used, of course a communication speed is low. Therefore, the user expects that compared with cases where a high-speed line is used, a response will take time. That is to say, even if response time is slightly longer, the user will not mind it.

As has been described, an update probability corresponding to a line speed is applied. For example, this makes it possible to make the amount of an increase in response time caused by index update at data retrieval time fall within the range of an allowable error of response time in communication. As a result, a user does not feel a delay in a data retrieval process, the frequency with which an index update process is performed is decreased as much as possible, and efficiency in processing by the database server 200 is improved.

(Other Embodiments)

In the second embodiment an index structured by the use of a B-Tree is used. However, the data structure of an index may be another data structure. For example, the data structure of an index may be a B-plus Tree data structure.

Furthermore, in the second and third embodiments the database server 200 has the function of performing an index update process in response to an index update request from the outside. However, a database server may not have such a function. In that case, for example, the index update determination unit 120 of the Web server 100 or the index update determination unit 320 of the Web server 300 may transmit to the database server in place of an index update request a data retrieval request by which instructions to perform data retrieval of some kind are given. The database server performs an index update process in response to the data retrieval request. As a result, in a system in which a database server not having the function of performing a process in response to an index update request is used, variations in time taken to make a response to a retrieval request are controlled.

In addition, in the second and third embodiments a process is performed with the cooperation of the Web server and the database server. However, the functions of the Web server and the database server may be realized by one information processing apparatus (computer). For example, the database server 200 may have the function of the Web server 100 or the Web server 300.

Moreover, in the second and third embodiments a probability with which an index update process is performed is set to a determined value by generating a random number. However, a probability with which an index update process is performed may be controlled by a technique other than random number generation. As indicated in the first embodiment, for example, whether to perform an index update process is determined on the basis of the number of times data update is performed. By doing so, a probability with which an index update process is performed is set to a determined value. Furthermore, time which has elapsed since the time when an index is updated the last time may be used. In that case, if a probability with which an index update process is performed is, for example, "0.01", then a Web server divides the time elapsed by 100. If the time elapsed is divisible by 100 (remainder is "0"), then the Web server determines to perform an index update process.

The CPU 101 executes programs. By doing so, the processes in the above embodiments are realized. However, a part of the processes described in the programs may be replaced with an electronic circuit. For example, at least a part of the above processing functions may be realized by an electronic circuit such as a DSP (Digital Signal Processor), an ASIC (Application Specific Integrated Circuit), or a PLD (Programmable Logic Device).

According to an aspect, variations in time taken to make a response to a retrieval request are controlled.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A database management method comprising:
   storing probabilities respectively in association with addresses of terminal apparatuses which output data update instructions in a memory, the terminal apparatuses being connected via lines on a network to an information processing apparatus including a processor, the probabilities each having a value that increases with an increase in a communication speed of a line connecting a terminal apparatus having an address associated with the probability and the information processing apparatus, the address identifying the terminal apparatus on the network;
   receiving, via the network, a packet including a data update instruction from one of the terminal apparatuses;
   updating data included in a database with an index in accordance with the data update instruction, the database with the index being stored in a storage device;
   obtaining, by the processor, at the time of the data included in the database being updated in accordance with the data update instruction, a probability associated with a request source address of the packet, from the memory, the request source address identifying the terminal apparatus having transmitted the packet;
   generating, by the processor, a random number at the time of the data included in the database being updated;
   determining, by the processor, to perform an index update process at the time of a value of the random number being within a determined range corresponding to the obtained probability; and
   updating the index in the storage device at the time of determining to perform the index update process.

2. The database management method according to claim 1, wherein the determining to perform the index update process includes:
   counting a number of times data included in the database is updated after a last index update process; and
   determining, at the time of the number of times counted reaching a determined value corresponding to the obtained probability, to perform the index update process.

3. The database management method according to claim 1, wherein the updating the index includes updating, by the processor or another processor included in another information processing apparatus connected via the network to the information processing apparatus including the processor, the index on the basis of history information indicative of a data update process performed on the database after a last index update process.

4. A non-transitory computer-readable storage medium storing a computer program which causes an information processing apparatus to perform a process comprising:
   storing probabilities respectively in association with addresses of terminal apparatuses which output data update instructions in a memory, the terminal apparatuses being connected via lines on a network to an information processing apparatus including a processor, the probabilities each having a value that increases with an increase in a communication speed of a line connecting a terminal apparatus having an address associated with the probability and the information processing apparatus, the address identifying the terminal apparatus on the network;
   receiving, via the network, a packet including a data update instruction from one of the terminal apparatuses;
   updating data included in a database with an index in accordance with the data update instruction, the database with the index being stored in a storage device;
   obtaining, at the time of the data included in the database being updated in accordance with the data update instruction, a probability associated with a request source address of the packet, from the memory, the request source address identifying the terminal apparatus having transmitted the packet;
   generating a random number at the time of the data included in the database being updated;
   determining to perform an index update process at the time of a value of the random number being within a determined range corresponding to the obtained probability; and
   updating the index in the storage device at the time of determining to perform the index update process.

5. An information processing apparatus comprising:
   a memory configured to store therein probabilities respectively in association with addresses of terminal apparatuses which output data update instructions, the terminal apparatuses being connected via lines on a network to an information processing apparatus including a processor, the probabilities each having a value that increases with an increase in a communication speed of a line connecting a terminal apparatus having an address associated with the probability and the information processing apparatus, the address identifying the terminal apparatus on the network; and a processor coupled to the memory and configured to perform a process including:

receiving, via the network, a packet including a data update instruction from one of the terminal apparatuses;

updating data included in a database with an index in accordance with the data update instruction, the database with the index being stored in a storage device;

obtaining, at the time of the data included in the database being updated in accordance with the data update instruction, a probability associated with a request source address of the packet, from the memory, the request source address identifying the terminal apparatus having transmitted the packet;

generating a random number at the time of the data included in the database being updated;

determining to perform an index update process at the time of a value of the random number being within a determined range corresponding to the obtained probability; and updating the index in the storage device at the time of determining to perform the index update process.

\* \* \* \* \*